United States Patent [19]
Wu

[11] Patent Number: 5,618,242
[45] Date of Patent: Apr. 8, 1997

[54] APPARATUS FOR TORQUE-CONVERTER CLUTCH TRANSMISSION

[76] Inventor: Cheng-hsiung Wu, 2nd Fl., No. 24, Lane 430, Fuhsing N. Rd., Taipei, Taiwan

[21] Appl. No.: 524,172

[22] Filed: Sep. 6, 1995

[51] Int. Cl.$^6$ ................................................ F16H 47/04
[52] U.S. Cl. ........................ 475/72; 475/76; 475/91; 475/93
[58] Field of Search .......................... 475/72, 73, 76, 475/80, 91, 92, 93, 94, 102, 104, 108

[56] References Cited

U.S. PATENT DOCUMENTS

| | | | |
|---|---|---|---|
| 5,113,723 | 5/1992 | Ishino et al. | 475/72 X |
| 5,222,921 | 6/1993 | Garcia | 475/72 |
| 5,337,629 | 8/1994 | Kita | 475/72 X |
| 5,403,241 | 4/1995 | Jarchow et al. | 475/72 |
| 5,421,790 | 6/1995 | Lasoen | 475/80 X |
| 5,466,197 | 11/1995 | Mitsuya et al. | 475/72 |
| 5,524,436 | 6/1996 | Ishino et al. | 475/76 X |

Primary Examiner—Charles A. Marmor
Assistant Examiner—Peter T. Kwon
Attorney, Agent, or Firm—Poms, Smith, Lande & Rose

[57] ABSTRACT

An apparatus for torque-converter clutch transmission includes a final output planetary gear, at lease a braking pump, a compound planetary gear train, an oil path system, and a centrifugal pump. The final output planetary gear includes a sun gear mounted on an engine crankshaft, a planetary carrier mounted on an output shaft, and a ring gear. The compound planetary gear train includes first and second planetary gears which together share a common ring gear. The first planetary gear further includes a sun gear mounted to the engine crankshaft and a planetary carrier connected to a rotor shaft of the braking pump, and a ring gear, while the second planetary gear further includes a sun gear connected to the ring gear of the final output planetary gear and a planetary carrier fixedly mounted to an inner wall of a gear box. The centrifugal pump is mounted on the engine crankshaft for sensing rotation speed of the engine crankshaft and outputs predetermined amount of pressurized fluid responsive to the rotation speed of the engine crankshaft to control a disengagement valve for braking the braking pump which, in turn, brakes the final output planetary gear and the compound planetary gear train to obtain a desired transmission.

3 Claims, 26 Drawing Sheets

APPARATUS FOR TORQUE-CONVERTER CLUTCH TRANSMISSION

BACKGROUND OF THE INVENTION

1. Field of the Invention

The present invention relates to an apparatus for torque-converter clutch transmission.

2. Description of Related Art

In the next century there will be more vehicles on the roads, and they have to frequently run and stop due to crowded traffic. Complicated operation of clutch for obtaining various speeds makes driving difficult, and there will be in a more serious situation in energy shortage. Conventionally, torque-converter means has been applied to passenger vehicles, yet it is uneconomical and unsafe if applied to goods vehicles as having a high fuel-consuming rate and bad engine braking effect as well as being easily broken down.

Therefore, there has been a long and unfulfilled need for a torque-converter clutch transmission apparatus which has a high transmission efficiency and can be widely applied to various vehicles including goods vehicles.

SUMMARY OF THE INVENTION

It is an object of the present invention to provide an apparatus for torque-converter clutch transmission which can be mounted to both of large and small vehicles to provide a stepped automatic transmission such that the driver does not need to shift to the first gear to start the vehicle, and to provide an automatic clutch of power transmission for the starting and running/stopping of the vehicle.

It is another object of the present invention to provide an apparatus for torque-converter clutch transmission which (1) provides the driver with a comfort similar to that provided by conventional torque-converter automatic gear shifting means, (2) has a power transmission efficiency almost the same as that of a manual gear box, (3) is more durable than torque-converter automatic transmission gear box, (4) can be combined with a conventional manual gear box, and (5) provides reliable transmission as well as engine braking effect.

The apparatus for torque-converter clutch transmission in accordance with the present invention may provide a variable stepless torque in response to the load status. When the torque conversion ratio is set in a range of 3:1 to 1:1, the apparatus transmits under a gear reduction ratio of 3:1 under the maximum load with a transmission efficient of about 90%. However, the apparatus, when under light load (e.g., the torque conversion ratio is 1:1), transmits under a ratio of gear of 1:1 with a transmission efficient of almost 100%. Thus, the present apparatus possesses stepped automatic torque conversion function as well as automatic clutching of power transmission.

The apparatus of the present invention, in addition to replacing the torque-converter clutch of automatic torque-converter gear box, may replace a dry clutch of a conventional manual transmission gear box. More specifically, the present apparatus may incorporate with the conventional manual transmission gear box of a vehicle. For example, if the torque conversion ratio of the present apparatus is set in a range of 3:1 to 1:1, while the driver of the vehicle, say a truck, selects to start with a ratio of gear of 1.8:1, the final ratio of gear for starting is 5.4:1. If the vehicle is an automobile or a small goods vehicle, and the driver of which selects to start with a ratio of gear of 1:1, the final ratio of gear for starting is 3:1. Thus, a vehicle equipped with the present apparatus provides a continuously variable transmission no matter the vehicle runs in downtown, mountain area, or on a crowded road. Besides, the driver may select any low gear for engine braking.

Other objects, advantages, and novel features of the invention will become more apparent from the following detailed description when taken in conjunction with the accompanying drawings.

DESCRIPTION OF THE PREFERRED EMBODIMENTS

1. Definition

In the case of sun gear, planet carrier, and ring gear of a planetary gear of the present invention, the gear receiving the transmission of external power is called a driving member, the gear being braked resulting in a reduction in the rotation thereof is called a braking member, the remaining one is called a driven member.

2. First Embodiment of the Invention

Figure 1:
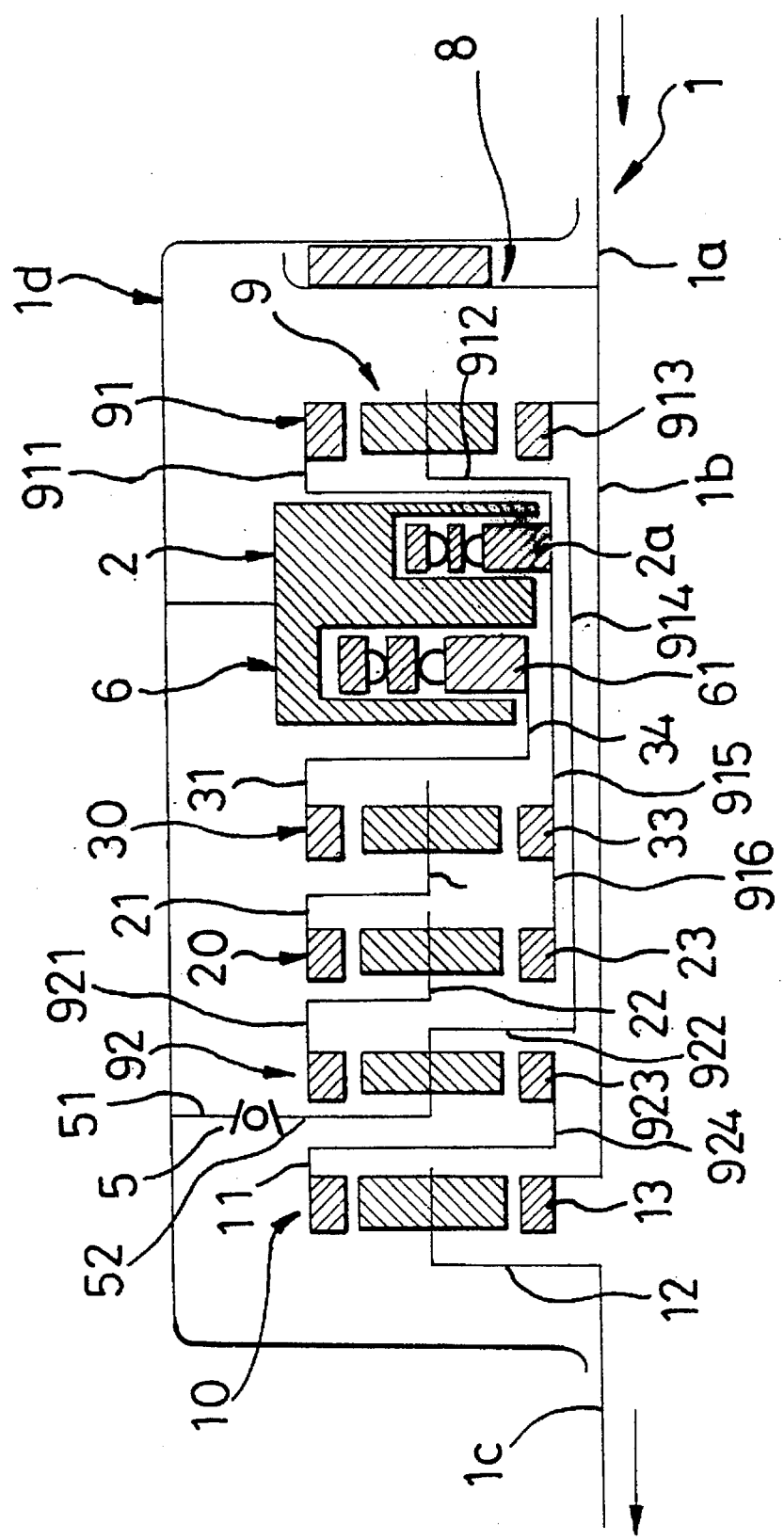
FIG. 1 is a schematic cross-sectional view of a first embodiment of an apparatus for torque-converter clutch transmission in accordance with the present invention.

Referring to FIG. 1, a first embodiment of a torque converter in accordance with the present invention includes a final output planetary gear 10, a compound planetary gear train 9, a first transition planetary gear 20, a second transition planetary gear 30, and a one-way clutch 5.

It is appreciated that there are three power transmission circuits (first, second, and third) in this embodiment, and the "first power transmission circuit" means that the power from an engine crankshaft is directly inputted into a sun gear 13 of the final output planetary gear 10, the "second power transmission circuit" means that the power from a ring gear 11 is transmitted via a common gear member of the compound planetary gear train 9, and the "third power transmission circuit" means that insufficient power in the compound planetary gear train 9 is supplied by the first and second transitional planetary gears 20 and 30 via transitional transmission.

The final output planetary gear 10 includes a sun gear 13 which is connected to a rear section 1b of an engine power output shaft 1 (e.g., an engine crankshaft which inputs power into the present apparatus) and functions as the driving member, a planetary carrier 12 which is connected to a front section of an output shaft 1c (e.g., a rear propeller shaft) and functions as the driven member which is also the output member, and a ring gear 11 which is connected to a rear sun gear 923 of a second planetary gear 92 of the compound planetary gear train 9 and functions as the braking member which is also the power input member for the second power transmission circuit.

The compound planetary gear train 9 includes first and second planetary gears 91 and 92, each of which has a sun gear, a planet carrier and a ring gear which are respectively accommodated to function as either a driving member, a driven member, or a braking member therewithin. A driven gear in the second planetary gear relates to a corresponding driving gear in the first planetary gear. A driving gear in the second planetary gear relates to a corresponding driven gear in the first planetary gear. A braking gear in the second planetary gear relates to a corresponding braking gear in the first planetary gear.

In the first planetary gear 91, the sun gear 913 is mounted on a front section 1a of the engine power input shaft 1, the ring gear 911 is connected to a hollow rotor shaft 2a of a braking pump 2, and the planetary carrier 912 is connected to a front section of a first hollow extension shaft 914 which is freely rotatably mounted around the engine power output shaft 1. The ring gear 911 is connected to a second hollow extension shaft 915 which extends through the hollow rotor shaft 2a and is connected to a sun gear 33 of the second transition planetary gear 30. A third hollow extension shaft 916 is connected to the second hollow extension shaft 915 at a first end thereof and extends between the sun gear 33 and a sun gear 23 of the first transition planetary gear 20.

A rear end of the first hollow extension shaft 914 is connected to a planetary carrier 922 of the second planetary gear 92, i.e., the planetary carriers 912 and 922 of the first and second planetary gears 91 and 92 share a common hollow extension shaft 914. The planetary carrier 922 of the second planetary gear 92 is further connected to the one way clutch 5. A sun gear 923 of the second planetary gear 92 is connected to the ring gear 11 of the final output planetary gear 10, while a ring gear 921 of the second planetary gear 92 is connected to a planetary carrier 22 of the first transition planetary gear 20. The gear reduction ratio of the first and second planetary gears 91 and 92 of the compound planetary gear train 9 is 1:1.

In the first transition planetary gear 20, the sun gear 23 is mounted to a second end of the third hollow extension shaft 916, the planetary carrier 22 is connected to the ring gear 921 of the second planetary gear 92, and the ring gear 21 is connected to the planetary carrier 32 of the second transition planetary gear 30. When the gear reduction ratio is relatively high, the first transition planetary gear 20 supplies a first transition power for the third power transmission circuit to provide additional torque and high transmission efficiency for low gears.

In the second transition planetary gear 30, the sun gear 33 is mounted to the second hollow extension shaft 915, the planetary carrier 32 is connected to the ring gear 21 of the first transition planetary gear 20, the ring gear 31 is mounted to a rotor shaft 61 of a transition braking pump 6. When the gear reduction ratio is in a mediate range, the second transition planetary gear 30 supplies a second transition power for the third power transition circuit. In addition to provide a high transmission efficiency, the second transition planetary gear 30 also supplies torque to the compound planetary gear train 9 before the latter obtains an effective engagement for transmission, The one way clutch 5 includes a first member 51 which is fixedly mounted to an inner wall of a gear box 1d and a second member 52 which is rotatable in one direction and is connected to the planetary carrier 922 of the second planetary gear 92, thereby prohibiting reverse rotation of the planetary carriers 912 and 922.

A sensing means, e.g., a centrifugal pump 8, is mounted on the engine power output shaft 1 for sensing rotation speed of the engine power output shaft 1 and outputting predetermined amounts of pressurized working fluid responsive to the rotation speed of the engine power output shaft 1 to control a disengagement valve 250 for braking the braking pump 2 which, in turn, brakes the braking members of the planetary gears, thereby obtaining a transmission.

Figure 3:
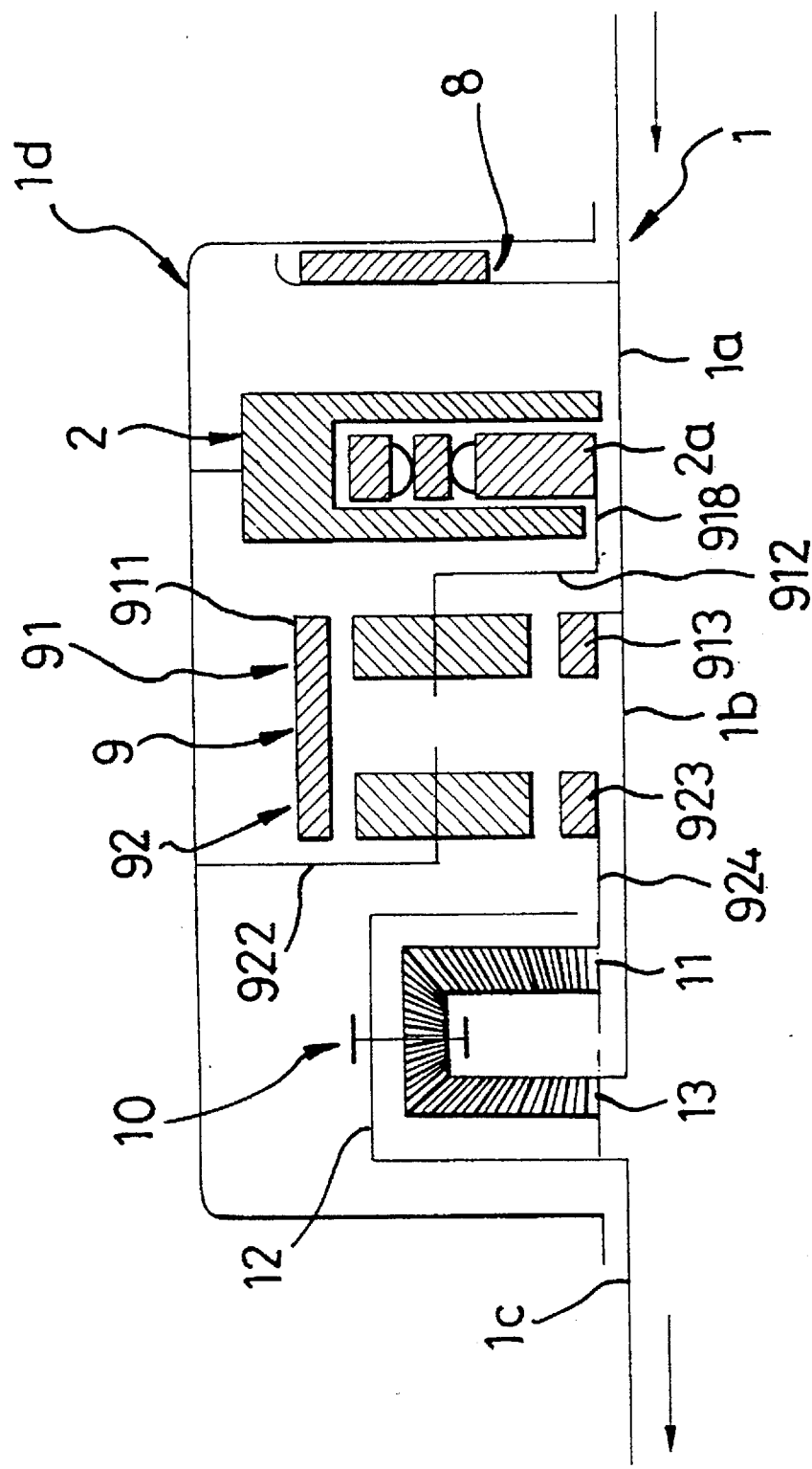
FIG. 3 is a schematic cross-sectional view of a third embodiment of an apparatus for torque-converter clutch transmission in accordance with the present invention.

Referring now to FIG. 3, the oil path system for the first embodiment of the present invention includes a transition braking pump 6 having an outer casing securely fixed to an inner wall of the gear box 1*d* and a rotor shaft 61 which engages with the ring gear 31 of the second transition planetary gear 30. The oil path system comprises a first oil path 601 having a first end communicated to a first port of the transitional braking pump 6 (the first port serves as an outlet for working fluid when the transitional braking pump 6 performs its braking function) and a second end communicated to a first joint 602, a second oil path 611 having a first end communicated to the first joint 602 and a second end communicated to a second joint 612, a third oil path 613 having a first end communicated to the second joint 603 and a second end communicated to a third joint 616, a throttling oil path 617 having a first end communicated to the third joint 616 and a second end communicated to an inlet of a supercharger relief valve 610, a fourth oil path 618 having a first end communicated to an outlet of the supercharger relief valve 610 and a second end communicated to a fourth joint 632, a fifth oil path 633 having a first end communicated to the fourth joint 632 and a second end communicated to an inlet of a high pressure relief valve 630, a sixth oil path 634 having a first end communicated to an outlet of the high pressure relief valve 630 and a second end communicated to a fifth joint 653, a seventh oil path 651 having a first end communicated to the third joint 616 and a second end communicated to an inlet of a first check valve 650, an eighth oil path 652 having a first end communicated to an outlet of the first check valve 650 and a second end communicated to a sixth joint 253, a ninth oil path 254 having a first end communicated to the sixth joint 253 and a second end communicated to an inlet of a disengagement valve 250 for idling, a tenth oil path 255 having a first end communicated to an outlet of the disengagement valve 250 for idling and a second end communicated to a seventh joint 256, an eleventh oil path 257 having a first end communicated to the seventh joint 256 and a second end communicated to the fifth joint 653, a twelfth oil path 656 having a first end communicated to the fifth joint 653 and a second end communicated to an inlet of a shut-off valve 700 for parking.

The oil path system further comprises a thirteenth oil path 657 having a first end communicated to an outlet of the shut-off valve 700 and a second end communicated to an eighth joint 674, a fourteenth oil path 631 having a first end communicated to the fourth joint 632 and a second end communicated to an inlet of a second check valve 640, a fifteenth oil path 641 having a first end communicated to an outlet of the second check valve 640 and a second end communicated to a ninth joint 208, a sixteenth oil path 603 having a first end communicated to the first joint 602 and a second end communicated to a first port of a rear manual valve 600 for neutral gear, a seventeenth oil path 604 having a first end communicated to a second port of the rear manual valve 600 for neutral gear and a second end communicated to a tenth joint 606, an eighteenth oil path 605 having a first end communicated to a second port of the transitional braking pump 6 (the second port serves as an inlet for working fluid when the transitional braking pump 6 performs its braking function) and a second end communicated to the tenth joint 606, a nineteenth oil path 607 having a first end communicated to the tenth joint 606 and a second end communicated to an outlet of a guiding check valve 620, a twentieth oil path 608 having a first end communicated to an inlet of the guiding check valve 620 and a second end communicated to an eleventh joint 671, a twenty-first oil path 672 having a first end communicated to the eleventh joint 671 and a second end communicated to an inlet of a third check valve 670, a twenty-second oil path 673 having a first end communicated to an outlet of the third check valve 670 and a second end communicated to the eighth joint 674, a twenty-third oil path 675 having a first end communicated to the eighth joint 674 and a second end communicated to an inlet of a cooler 730, a twenty-fourth oil path 676 having a first end communicated to an outlet of the cooler 730 and a second end communicated to an oil tank 720, a first external guiding oil path 621 having a first end communicated to the first joint 602 and a second end communicated to an inlet of a valve guiding chamber of the guiding check valve 620, a twenty-fifth oil path 662 having a first end communicated to a twelfth joint 212 and a second end communicated to an inlet of a fourth check valve 660, a twenty-sixth oil path 661 having a first end communicated to an outlet of the fourth check valve 660 and a second end communicated to the eleventh joint 671.

The inlet and outlet of the disengagement valve 250 for idling are respectively communicated to the second end of the ninth oil path 254 and the first end of the tenth oil path 255. The disengagement valve 250 controls partial or complete closing of the oil circuit of the transition braking pump 6 and a braking pump 2, thereby providing either one of an idling status or engaged status for starting under power transmission from a gear box. A sensing means, e.g., a centrifugal pump 8 or an electric sensor, senses the rotation speed of the engine and outputs a certain amount of working fluid or sending a signal to create an active force to act on a spring (not shown) in the disengagement valve 250, thereby providing a function of opening or closing the valve 250. When the engine is in an idling mode, the disengagement valve 250 is opened under the action of the spring therein when an external force (i.e., the above-mentioned active force) is under a predetermined value, such that the braking pump 2 rotates freely. When the valve 250 is closed, the ring gear 11 of the final planetary gear 10 rotates freely in the gear box, and the working fluid outputted by the transition braking pump 6 is completely blocked by throttling, such that the ring gear 11 is completely braked. Accordingly, the lowest gear for starting obtains power for transmission via effective engagement. The disengagement valve 250 may further include a remote controller (not shown) attached to the brake pedal (not shown) via wiring. When the brake pedal is pressed to a predetermined extent (e.g., two thirds of the whole available displacement of the brake pedal), the disengagement valve 250 is completely opened under action of the wire. This avoids engine dies in case of emergent braking which results in complete stop of the rear propeller shaft and the disengagement valve 250 fails to respond in time for providing an automatic control. Furthermore, when the disengagement valve 250 is closed, the working fluid outputted by the braking pump 2 is controlled by a low pressure relief valve 240 and a mediate pressure relief valve 260 which will be described in detail hereinafter.

The first and second ports of the rear manual valve 600 are respectively communicated to the second end of the sixteenth oil path 603 and the first end of the seventeenth oil path 604. The rear manual valve 600 and a front manual valve 200 together form a valve unit and share a common sliding axle (not shown). When this valve unit is in a closed status, the opening thereof is effected under manual operation of the driver. More specifically, the valve unit includes a remote controller (not shown) attached to a gear shifting lever (at a position adjacent to an upper end of the gear shifting lever) via a first wire. The valve unit further includes a second wire which is in parallel connection with the first wire and is attached to the clutch pedal. The valve unit may also have an electromagnetic switch which may be remotely manually controlled by the gear shifting lever, the purpose of which is to provide a remote control to open the valve unit when gear shifting is required, such that the working fluid outputted from or inputted into the transition braking pump 6 fully passes through the valve unit and thus obtains a free rotation status, i.e., the gear box is in a neutral gear.

The inlet and outlet of the high pressure relief valve 630 are respectively communicated to the second end of the fifth oil path 633 and the first end of the sixth oil path 634. The maximum flux percentage of working fluid released via this high pressure relief valve 630 is the remaining flux percentage (which may be set according to design) of the working fluid outputted by the transition braking pump 6 under a certain extent of braking after the disengagement valve 250 is closed. The said remaining flux percentage of the working fluid and the rotational speed of the transitional braking pump 6 control the braking extent of the braking member (the ring gear 21) of the first transition planetary gear 20 and the braking member (the ring gear 31) of the second transition planetary gear 30, such that the two braking members 21 and 31 may obtain a relatively high reactive force from the variable-speed transmission of the third power transmission circuit, thereby generating high efficient torque conversion to a various extent.

The high pressure relief valve 630 may detect a pressure value of the working fluid via an oil circuit communicated to the inlet thereof and automatically release pressure responsive to the detected pressure value which is in proportion with the torque conversion ratio of the gear box. When the torque conversion ratio and the pressure value is below a predetermined value, the high pressure relief valve 630 is completely closed. The output oil circuit of the transitional braking pump 6 is also completely closed. The transitional braking pump 6 stops and accordingly brakes and thus stops the braking members of the first and second transition planetary gears 20 and 30, so as to provide an effective engagement point for transmission, e,.g., if the gear ratio of the final output planetary gear 10 is 1:3:2, the torque conversion ratio for effective transmission is 1.5:1.

As mentioned in the above paragraph, the inlet of the high pressure relief valve 630 is connected to the second end of the fifth oil path 633, the purpose of which is to provide the working fluid in the fifth oil path 633 with a relatively high pressure such that part of the high pressure working fluid may flow via the fourth joint 632, the fourteenth oil path 631, the second check valve 640, the fifteenth oil path 641, the ninth joint 208, oil path 207, joint 206, and oil path 205, and finally enters the braking pump 2. More specifically, the high pressure working fluid which is supposed to be released is cycled to the braking pump 2 and thus compensates the power loss of the ring gear 911 of the first planetary gear 91 of the compound planetary gear train 9, thereby increasing the transmission efficiency.

The inlet and outlet of the supercharger relief valve 610 are respectively communicated to the second end of the throttling oil path 617 and the first end of the fourth oil path 618. The flux percentage controlled by valve 610 and the throttling oil path 617 is the same as the released flux controlled by the high pressure relief valve 630, yet the pressure value of the working fluid in the former is lower than that of the working fluid in the latter. A primary function of valve 610 is that when the torque conversion ratio of the gear box is lower than a predetermined value, the compound planetary gear train 9 starts to perform effective transmission and cuts off the throttling oil path 617 as well as the fourth oil path 618, thereby completely braking the associated braking members and the transitional braking pump 6.

The inlet and outlet of the shut-off valve 700 for parking are respectively communicated to the second end of the twelfth oil path 656 and the first end of the thirteenth oil path 657. When the engine stops, the shut-off park valve 700 is closed under the action of a spring therein. When the rotation speed of the engine reaches about 500 r.p.m., the shut-off valve 700 is opened to keep oil paths 656 and 657 open. A primary function of this valve 700 is to prevent the vehicle from sliding backwards when in a neutral gear for parking.

The inlet and outlet of the guiding check valve 620 are respectively communicated to the second end of the nineteenth oil path 607 and the first end of the twentieth oil path 608. The second end of the first external guiding oil path 621 is communicated to the inlet of the valve guiding chamber of the guiding check valve 620. A primary function of the guiding check valve 620 is that when the supercharger relief valve 610 is completely closed, the second power transmission circuit of the compound planetary gear train 9 starts to perform effective transmission to a various extent, while the working fluid outputted and braked by the braking pump 2 passes through oil paths 201, 221, 223, valve 220, oil path 224, check valve 230, oil paths 225, 611, joints 602, the first external guiding oil path 621, and enters the guiding check valve 620 to thereby open a reverse oil circuit therein. Accordingly, the working fluid outputted by the braking pump 2 passes through the first end of the first oil path 601 and enters the transitional braking pump 6, thereby forcing the transitional braking pump 6 and the ring gear 31 of the second transitional planetary gear 30 to rotate in a direction reverser to their original rotational direction, thereby regaining the energy of the released pressurized oil which is supposed to be lost during the engagement of the mechanical members. A second function of the guiding check valve 620 is to prevent the transitional braking pump 6 to rotate in a reverse direction when the vehicle is sliding under the action of inertial force, thereby providing an engine braking effect.

The inlet and outlet of the fourth check valve 660 are respectively communicated to the second end of the twenty-fifth oil path 662 and the first end of the twenty-sixth oil path 661. The fourth check valve 660 prevents the braking pump 2 from sucking-overheated working fluid from the twentieth oil path 608 which has not been cooled by the cooler 730 and filtered by the oil filter 710.

The inlet and outlet of the third check valve 670 are respectively communicated to the second end of the twenty-first oil path 672 and the first end of the twenty-second oil path 673. The third check valve 670 prevents the transitional braking pump 6 from sucking overheated working fluid from oil paths 657 or 675 which has not been cooled by the cooler 730 and filtered by the oil filter 710.

The inlet and outlet of the second check valve 640 are respectively communicated to the second end of the fourteenth oil path 631 and the first end of the fifteenth oil path 641. The second check valve 640 prevents from a reverse rotation of the braking pump 2 when the vehicle runs under the action of inertial force.

The inlet and outlet of the first check valve 650 are respectively communicated to the second end of the seventh oil path 651 and the first end of the eighth oil path 652. The first check valve 650 prevents the working fluid outputted by the braking pump 2 from entering the transitional braking pump 6 via oil paths 241, 251, 252, 652, and 651.

The braking pump 2 includes an outer casing fixedly mounted to the inner wall of the gear box 1 and a hollow rotor shaft 2a which is connected to an extension shaft extending from the ring gear 911 of the compound gear train 9. An oil circuit for the braking pump 2 includes a twenty-seventh oil path 201 having a first end communicated to a first port of the braking pump 2 (the first port serves as an outlet for working fluid when the braking pump 2 performs its braking function) and a second end communicated to a thirteenth joint 202, a twenty-eighth oil path 221 having a first end communicated to the thirteenth joint 202 and a second end communicated to a fourteenth joint 222, a twenty-ninth oil path 223 having a first end communicated to the fourteenth joint 222 and a second end communicated to an inlet of a relief valve 220, a thirtieth oil path 224 having a first end communicated to an outlet of the relief valve 220 and a second end communicated to an inlet of a fifth check valve 230, a thirty-first oil path 225 having a first end communicated to an outlet of the fifth check valve 230 and a second end communicated to the second joint 612, a thirty-second oil path 241 having a first end communicated to the fourteenth joint 222 and a second end communicated to a fifteenth joint 242, a thirty-third oil path 243 having a first end communicated to the fifteenth joint 242 and a second end communicated to an inlet of the low pressure relief valve 240, a thirty-fourth oil path 244 having a first end communicated to an outlet of the low pressure relief valve 240 and a second end communicated to a sixteenth joint 245, a thirty-fifth oil path 261 having a first end communicated to the sixteenth joint 245 and a second end communicated to an inlet of a mediate pressure relief valve 260, a thirty-sixth oil path 262 having a first end communicated to an outlet of the mediate pressure relief valve 260 and a second end communicated to a seventeenth joint 263, a thirty-seventh oil path 264 having a first end communicated to the seventeenth joint 263 and a second end communicated to the seventh joint 256, a thirty-eighth oil path 251 having a first end communicated to the fifteenth joint 242 and a second end communicated to an inlet of a sixth check valve 280, and a thirty-ninth oil path 252 having a first end communicated to an outlet of the sixth check valve 280 and a second end communicated to the sixth joint 253.

The circuit for the braking pump 2 further includes the ninth oil path 254, the tenth oil path 255, a second external guiding oil path 247 having a first end communicated to the third joint 616 and a second end communicated to a joint 246 for guiding oil paths, a third external guiding oil path 248 having a first end communicated to the joint 246 and a second end communicated to the inlet of the valve guiding chamber of the low pressure relief valve 240, a fourth external guiding oil path 265 having a first end communicated to the joint 246 and a second end communicated to an inlet of a valve guiding chamber of the mediate pressure relief valve 260, a fortieth oil path 203 having a first end communicated to the thirteenth joint 202 and a second end communicated to a first port of the front manual valve 200, a forty-first oil path 204 having a first end communicated to a second port of the front manual valve 200 and a second end communicated to an eighteenth joint 206, a forty-second oil path 205 having a first end communicated to a second port of the braking pump 2 (the second port serves as an inlet for working fluid when the braking pump 2 performs its braking function) and a second end communicated to the eighteenth joint 206, a forty-third oil path 207 having a first end communicated to the eighteenth joint 206 and a second end communicated to the ninth joint 208, a forty-fourth oil path 209 having a first end communicated to the ninth joint 208 and a second end communicated to an outlet of a seventh check valve 210, a forty-fifth oil path 211 having a first end communicated to an inlet of the seventh check valve 210 and a second end communicated to the twelfth joint 212, a forty-sixth oil path 213 having a first end communicated to the twelfth joint 212 and a second end communicated to an outlet of the oil filter 710, a forty-seventh oil path 214 having a first end communicated to an inlet of the oil filter 710 and a second end communicated to the oil tank 720, a forty-eighth oil path 271 having a first end communicated to the sixteenth joint 245 and a second end communicated an inlet of a delay-action switch valve 270, and a forty-ninth oil path 272 having a first end communicated to an outlet of the delay-action switch valve 270 and a second end communicated to the eighteenth joint 263.

The delay-action switch valve 270 is controlled by a sensing means (such as a centrifugal pump 8) which senses a rotational speed of the engine, e.g., when the engine rotates at a speed about 1500 r.p.m., the valve 270 is closed to keep a relatively low release circuit before sufficient torque is obtained. Nevertheless, if the vehicle originally runs under the action of inertial force or the vehicle coasts and the accelerator is deeply pressed for acceleration, a relatively high torque conversion may be obtained, and the rotational speed of the engine may be quickly increased to a value greater than 1500 r.p.m., causing the pressure of the working fluid in oil paths 613, 617, and 633 to reach a standard value for releasing such that the braking pump 2 rotates freely before the torque of the gear box is below an effective transmission point of the compound planetary gear train 9, thereby lowering a power loss and allowing the gear reduction ratio of the gear box to be automatically changed to a relatively large value under some conditions.

The first and second ports of the front manual valve 200 are respectively communicated to the second end of the fortieth oil path 203 and the first end of the forty-first oil path 204. As hereinbefore described, the front manual valve 200 and the rear manual valve 600 together form a valve unit and share a common sliding axle, and the arrangement and controlling method of both of the manual valves 200 and 600 are identical. When the vehicle is changed to be manually controlled, the valve unit may share a rotational load for neutral gear with the transitional braking pump 6, thereby providing an easier, faster disengagement for neutral gear for the torque converter.

The inlet and outlet of the low pressure relief valve 240 are respectively communicated to the second end of the thirty-third oil path 243 and the first end of the thirty-fourth oil path 244. The inlet of the guiding valve chamber of the low pressure relief valve 240 is communicated to the second end of external guiding oil path 248. After the disengagement valve 250 is closed, the valve guiding chamber of the low pressure relief valve 240 may suck working fluid outputted by the transitional braking pump 6 via oil paths 613, 247, and 248, thereby controlling the amount of working fluid to be released by the low pressure relief valve 240. The low pressure relief valve 240 operates when the torque conversion ratio of the gear box is in a range of 0.8–1.3 in which the low pressure relief valve 240 is completely opened when the torque conversion ratio is above 1.3 and is completely closed when the torque conversion ratio is lower than or equal to 0.8. Thus, the low pressure relief valve 240 is completely opened when the torque conversion ratio of the gear box is above 1.3, and the rotational speed of the engine is below 1500 r.p.m., the working fluid released by the low pressure relief valve 240 flows back to the oil tank 720 via oil paths 244, 271, and 272 before the delay-action switch valve 270 is closed. Under this condition, the braking pump 2 rotates freely without any load, and if the accelerator is re-pressed when the vehicle moves under the action of inertial force or coasts, the torque conversion ratio of the gear box is above 1.5:1.

The inlet and outlet of the mediate pressure relief valve 260 are respectively communicated to the second end of the thirty-fifth oil path 261 and the first end of the thirty-sixth oil path 262. The inlet of the valve guiding chamber of the mediate pressure relief valve 260 is communicated to the second end of external guiding oil path 265. After the disengagement valve 250 is closed, the mediate pressure relief valve 260 may suck working fluid outputted by the transitional braking pump 6 via oil paths 613, 247, and 265, thereby controlling the amount of working fluid to be released by the mediate pressure relief valve 260. The mediate pressure relief valve 260 operates when the torque conversion ratio of the gear box is in a range of 1.5–1.6 in which the mediate pressure relief valve 260 is completely opened when the torque conversion ratio reaches 1.6 and is completely closed when the torque conversion ratio is 1.5. When the delay-action switch valve 270 is closed, and if the torque conversion ratio of the gear box is above 1.6, the working fluid outputted by the braking pump 2 is released by the mediate pressure relief valve 260 almost without any pressure loss. To the contrary, the mediate pressure relief valve 260 is completely closed when the torque conversion ratio of the gear box is below 1.5, such that the working fluid outputted by the braking pump 2 flows to the transitional braking pump 6 via oil path 223, valve 220, and oil paths 244, 225, 611, and 601 to urge the transitional braking pump 6 to rotate in a reverse direction. Thus, the power which is supposed to be lost during operation of the braking pump 2 is regained to improve the transmission efficiency.

The inlet and outlet of the relief valve 220 are respectively communicated to the second end of the twenty-ninth oil path 223 and the first end of the thirtieth oil path 224. After the delay-action switch valve 270 and the mediate pressure relief valve 260 are completely closed, while the compound planetary gear train 9 starts to perform effective transmission when the torque conversion ratio of the gear box is below 1.5:1, the relief valve 220 throttles to a various extent, e.g., the limiting relief 220 is completely opened when the torque conversion ratio of the gear box reaches 1.5:1 and is completely closed when the torque conversion ratio is 1:1. During the throttling operation of the relief valve 220, the braking pump 2 obtains a braking, reactive force to a various extent, and thus urges the ring gear 911 of the compound planetary gear train 9 to move, such that the power in the third power transmission path system is shifted to the second power transmission path system. Thus, the compound planetary gear train 9 obtains an effective engagement to a various extent for transmission. When the torque conversion ratio of the gear box is 1:1, a power transmission in the third power transmission path system is completely stopped and the power thereof is completely shifted to the second power transmission path system, in which the gear reduction ratio of the torque converter becomes 1:1, i.e., a 100% engagement. Furthermore, the working fluid outputted by the relief valve 220 enters the transitional braking pump 6 via oil paths 224, 225, 611, and 601, urging the transitional braking pump 6 to rotate in a direction reverse to the rotational direction for braking, thereby regaining the power outputted by the relief valve 220.

The inlet and outlet of the fifth check valve 230 are respectively communicated to the second end of the thirtieth oil path 224 and the first end of the thirty-first oil path 225. The fifth check valve 230 prevents the working fluid in oil paths 225 and 611 from entering oil path 224. The inlet and outlet of the sixth check valve 280 are respectively communicated to the second end of the thirty-eighth oil path 251 and the first end of the thirty-ninth oil path 252. The sixth check valve 280 prevents the high pressure working fluid in oil paths 613, 651, 652, and 252 from entering the oil paths designed for low pressure working fluid. The inlet and outlet of the seventh check valve 210 are respectively communicated to the first end of the forty-fifth oil path 211 and the second end of the forty-fourth oil path 209. The seventh check valve 210 completely stops the braking pump 2 when the vehicle moves under the action of inertial force, and the inertial force may be used for engine braking.

The centrifugal pump 8 includes a rotor shaft engaging with a front section 1a of the engine power output shaft 1, and the oil circuit for the centrifugal pump 8 includes a fiftieth oil path 801 having a first end communicated to an outlet of the centrifugal pump 8 and a second end communicated to a nineteenth joint 802, a fifty-first oil path 822 having a first end communicated to the nineteenth joint 802 and a second end communicated to the inlet of the valve guiding chamber of the shut-off valve 700, a fifty-second oil path 803 having a first end communicated to the nineteenth joint 802 and a second end communicated to a twentieth joint 821, a fifty-third oil path 820 having a first end communicated to the twentieth joint 821 and a second end communicated to the inlet of the valve guiding chamber of the delay-action switch valve 270, a fifty-fourth oil path 804 having a first end communicated to the twentieth joint 821 and a second end communicated to a twenty-first joint 805, a fifty-fifth oil path 813 having a first end communicated to the twenty-first joint 805 and a second end communicated to the inlet of the valve guiding chamber of the disengagement valve 250, a fifty-sixth oil path 811 having a first end communicated to the twenty-first joint 805 and a second end communicated to an inlet of a high idling speed control valve 810, and a fifty-seventh oil path 812 having a first end communicated to an outlet of the high idling speed control valve 810 and a second end communicated to the oil tank 720.

The high idling speed control valve 810 includes an inlet communicated to the second end of the fifty-sixth oil path 811 and an outlet communicated to the first end of the fifty-seventh oil path 812. When the vehicle is under idling condition and the air conditioner thereof is switched on, or the engine is just started from a cold status and a choke of the vehicle is subsequently opened (the power sources for activating the two above-mentioned functions are electrically connected to an electromagnetic valve of the high idling speed control valve 810), an electric excitation is inputted to properly open the valve 810 synchronous to the activation of the air conditioner or the opening of the choke, such that the working fluid outputted by the centrifugal pump 8 maybe properly released. Responsive to this, it may be designed in a manner that the working fluid outputted under high rotational speed is capable of providing a sufficient force to close the disengagement valve 250, thereby increasing the idling speed of the engine.

In FIGS. 4A through 4G, arrows "→" indicate the flow path of working fluid due to siphon effect, arrows "--→" indicate the flow path of released working fluid, arrows ⇢ indicate the flow path of high pressure working fluid, and symbol ⊢⋯⊣ indicate the blocked area where the high pressure working fluid therein does not flow.

Figure 4:
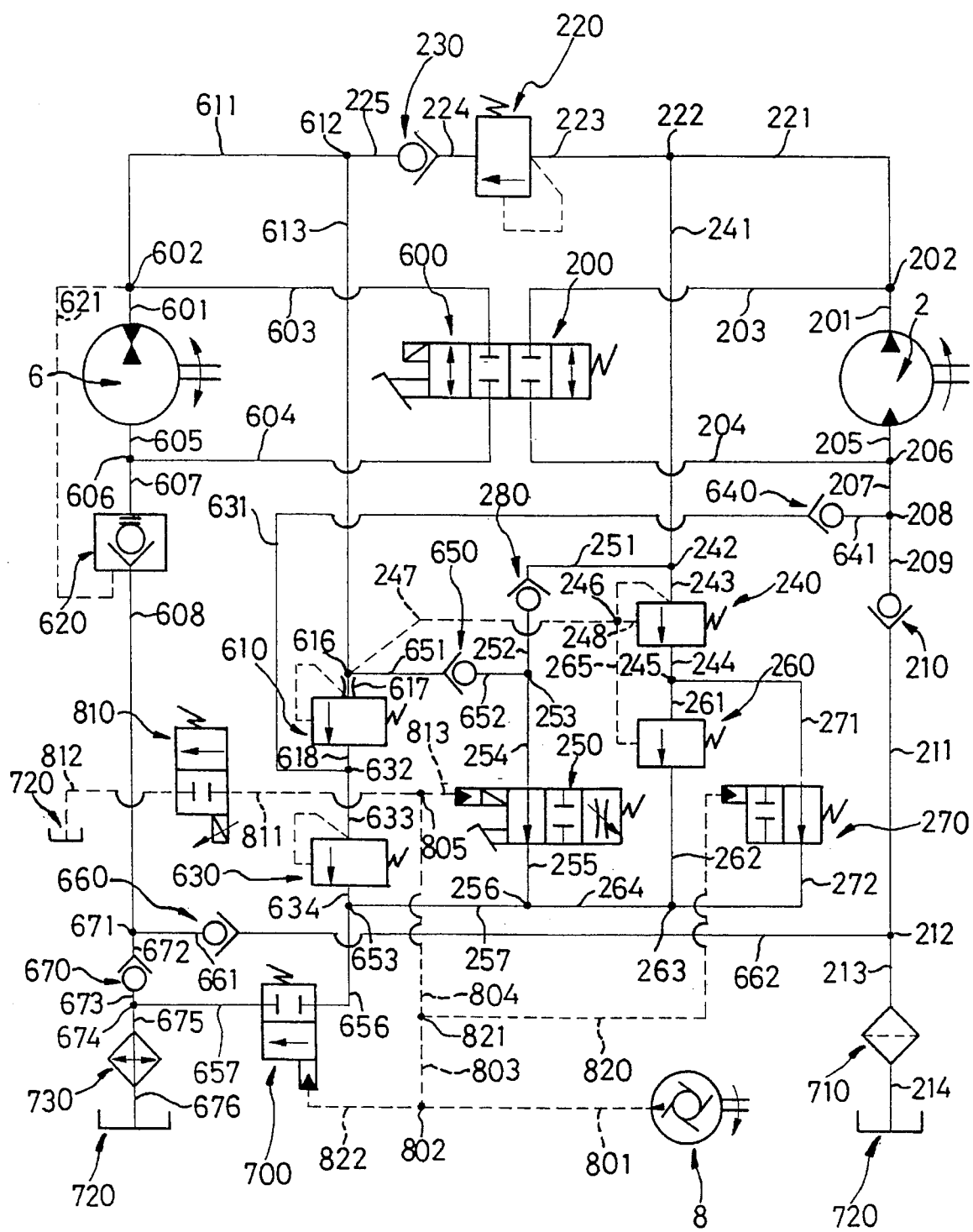
FIG. 4 is a schematic diagram of an oil system of the first embodiment in accordance with the present invention.
Figure 4A:
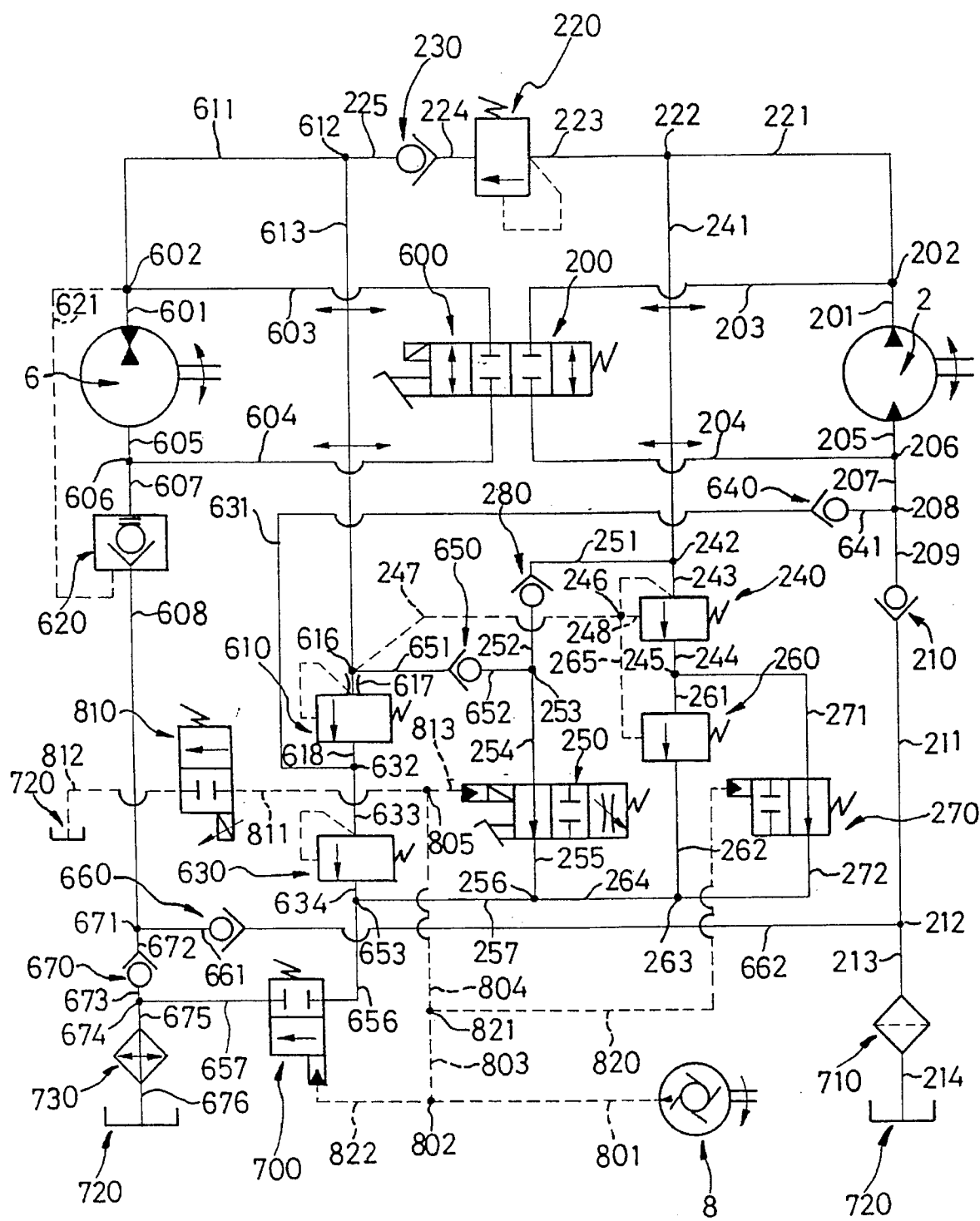
FIG. 4A is a schematic diagram of the oil system of FIG. 4, wherein the arrows show the path of the working fluid when under a neutral gear.

Referring to FIG. 4A, when in neutral gear, the manual switches 200 and 600 are opened, each of braking pumps 2 and 6 may rotate freely and thus generate the desired neutral gear for manual gear shifting.

Figure 4B:
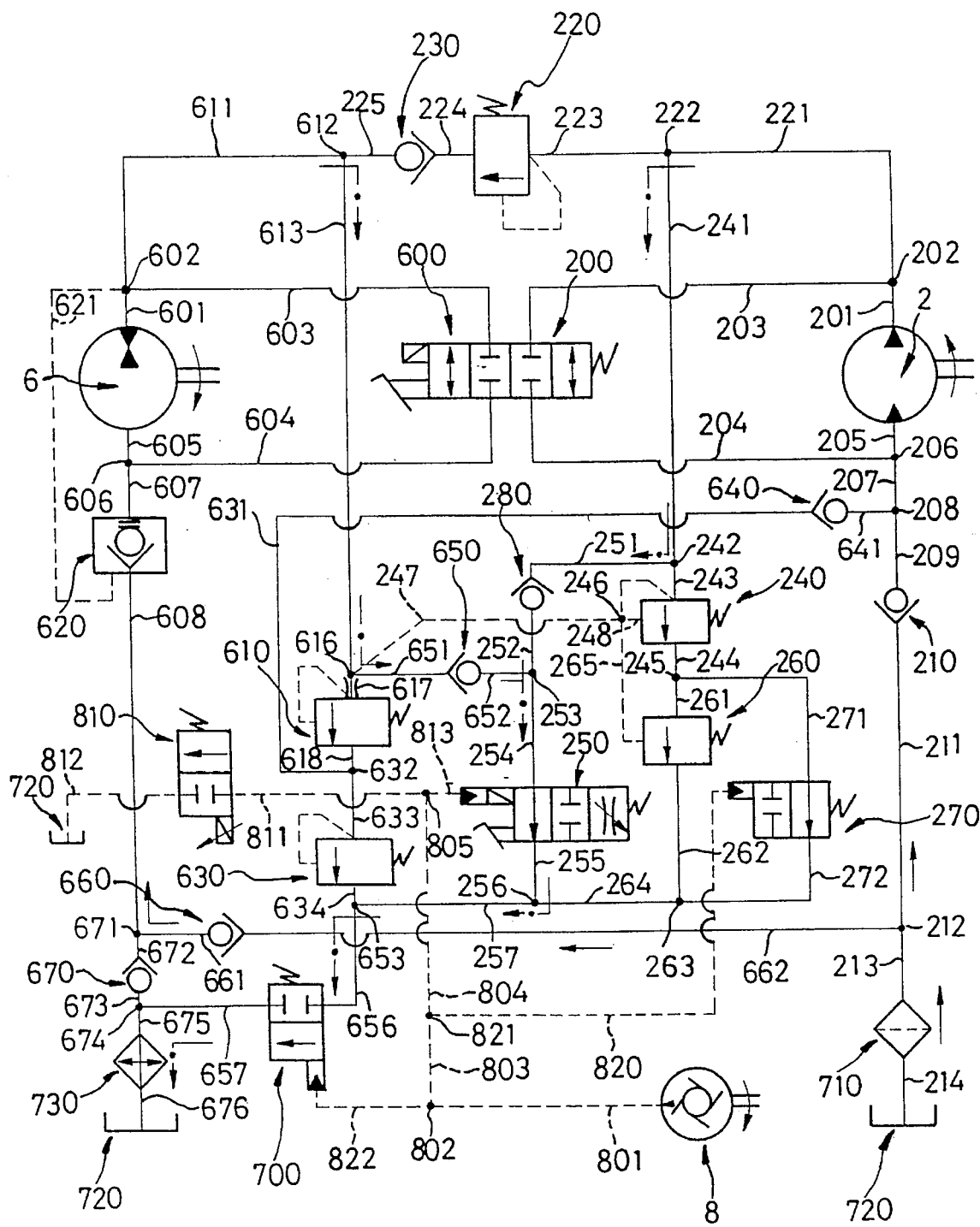
FIG. 4B is a schematic diagram of the oil system of FIG. 4, wherein the arrows show the path of the working fluid when under an engine idling condition.

Referring to FIG. 4B, the engine is under the idling condition, in which the disengagement valve 250 is not closed and the flow of the working fluid in the oil circuit is not throttled, while none of the braking pumps and braking members are effectively braked. Therefore, the torque converter is still in a disengaged status.

Figure 4C:
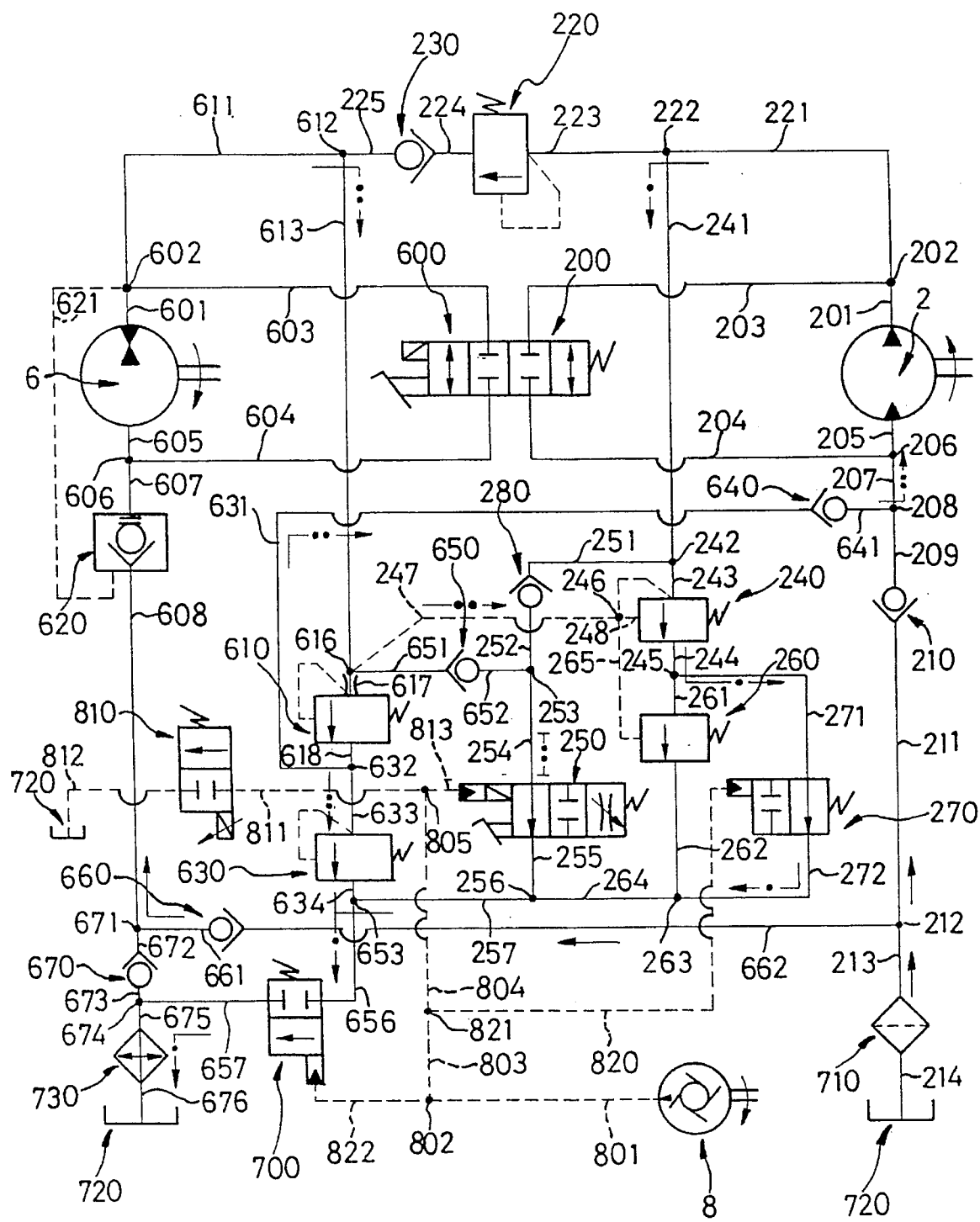
FIG. 4C is a schematic diagram of the oil system of FIG. 4, wherein the arrows show the path of the working fluid when the rotation speed of the engine is below 1500 r.p.m.

Referring to FIG. 4C, the rotational speed of the engine is higher than the idling speed and below 1500 r.p.m., in which the disengagement valve 250 is completely closed within a relatively short time. In this instance, the transitional braking pump 6 may obtain at least a half of a maximum braking effect thereof. Thus, the power under high gear reduction ratio for starting may be effectively transmitted, while the torque load ratio may be in a range between 3:1 to 1.5:1 responsive to the load of the gear box.

Figure 4D:
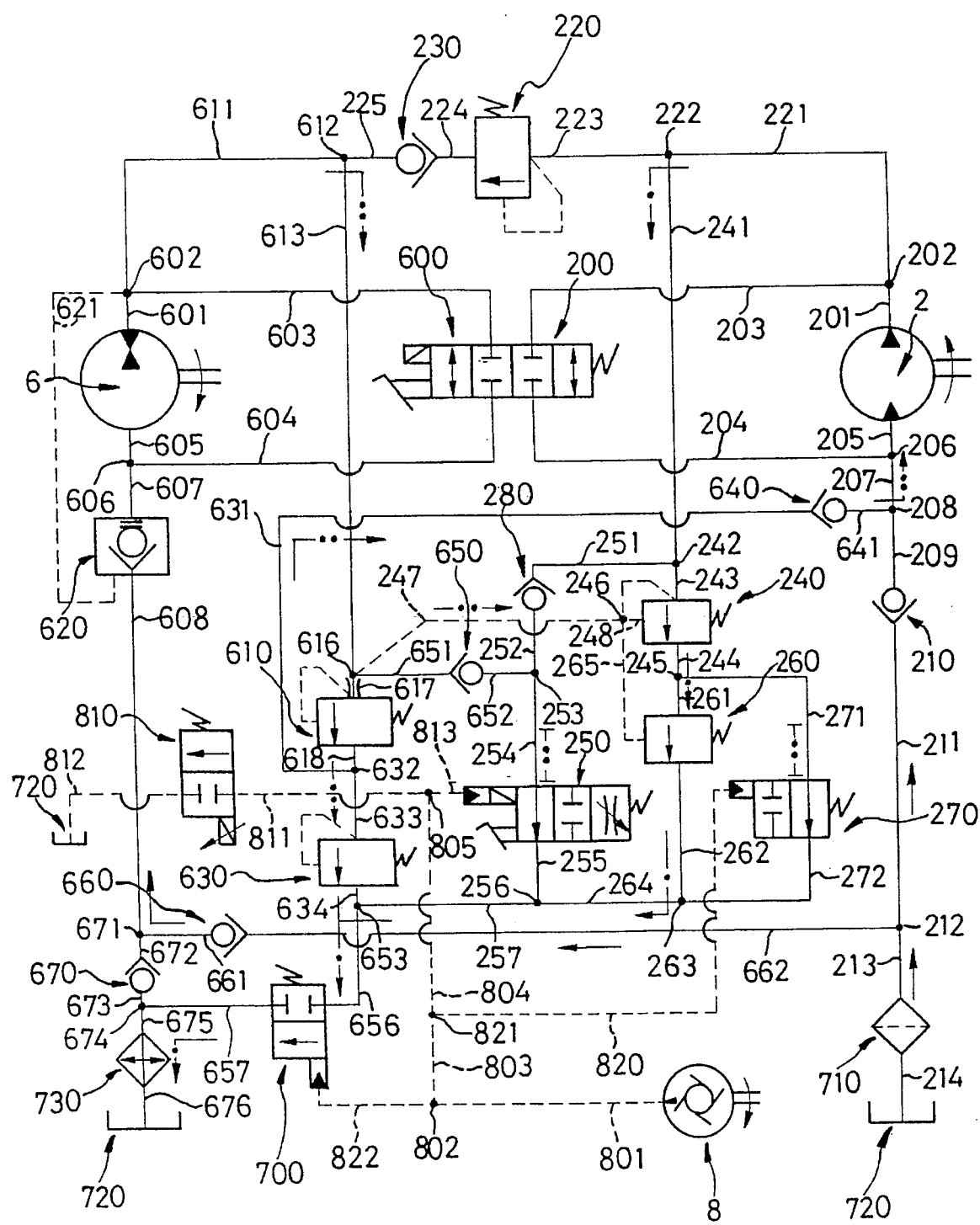
FIG. 4D is a schematic diagram of the oil system of FIG. 4, wherein the arrows show the path of the working fluid when under transition status of torque conversion.

FIG. 4D illustrates the oil path system when under transitional status of torque conversion while the rotational speed of the engine is higher than 1500 r.p.m.. The torque load ratio may be in a range between 3:1 to 1.5:1 responsive to the load of the gear box 1. The gear reduction ratio is 2:1 when the transitional braking pump 6 obtains ¾ of its maximum braking effect, and the gear reduction ratio is 1.5:1 when the transitional braking pump obtains ¼ of its maximum braking effect.

Figure 4E:
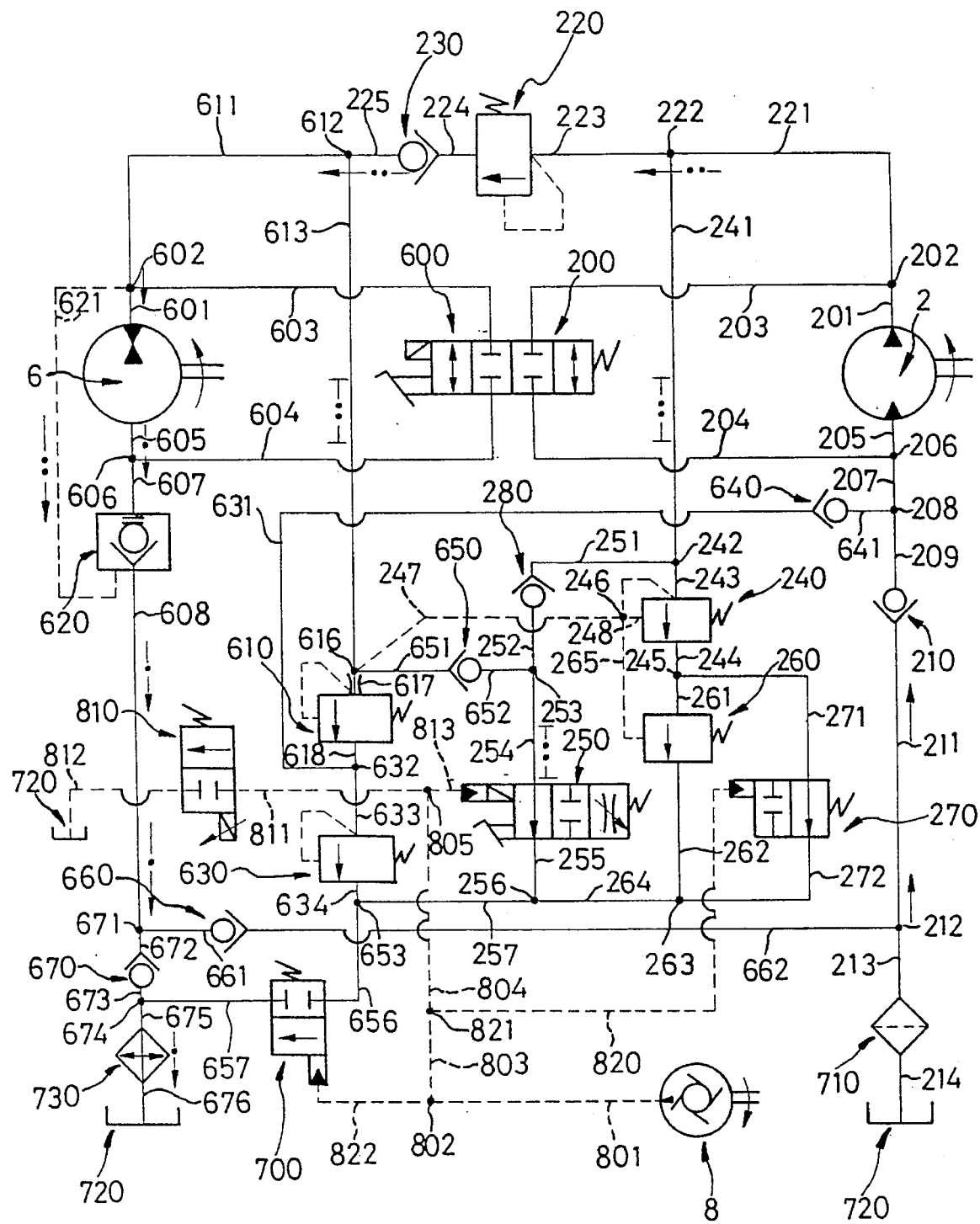
FIG. 4E is a schematic diagram of the oil system of FIG. 4, wherein the arrows show the path of the working fluid after effective engagement of the compound planetary gear train.

FIG. 4E illustrates the oil path system after effective engagement of the compound planetary gear train 9 while the torque load ratio of the gear box is in a range between 1.5:1 to 1:1. Furthermore, when the torque load ratio of the gear box is below 1.5:1, the second power transmission circuit starts to operate effectively, while the power originally transmitted via the third power transmission circuit is gradually shifted to the second power transmission circuit.

Figure 4F:
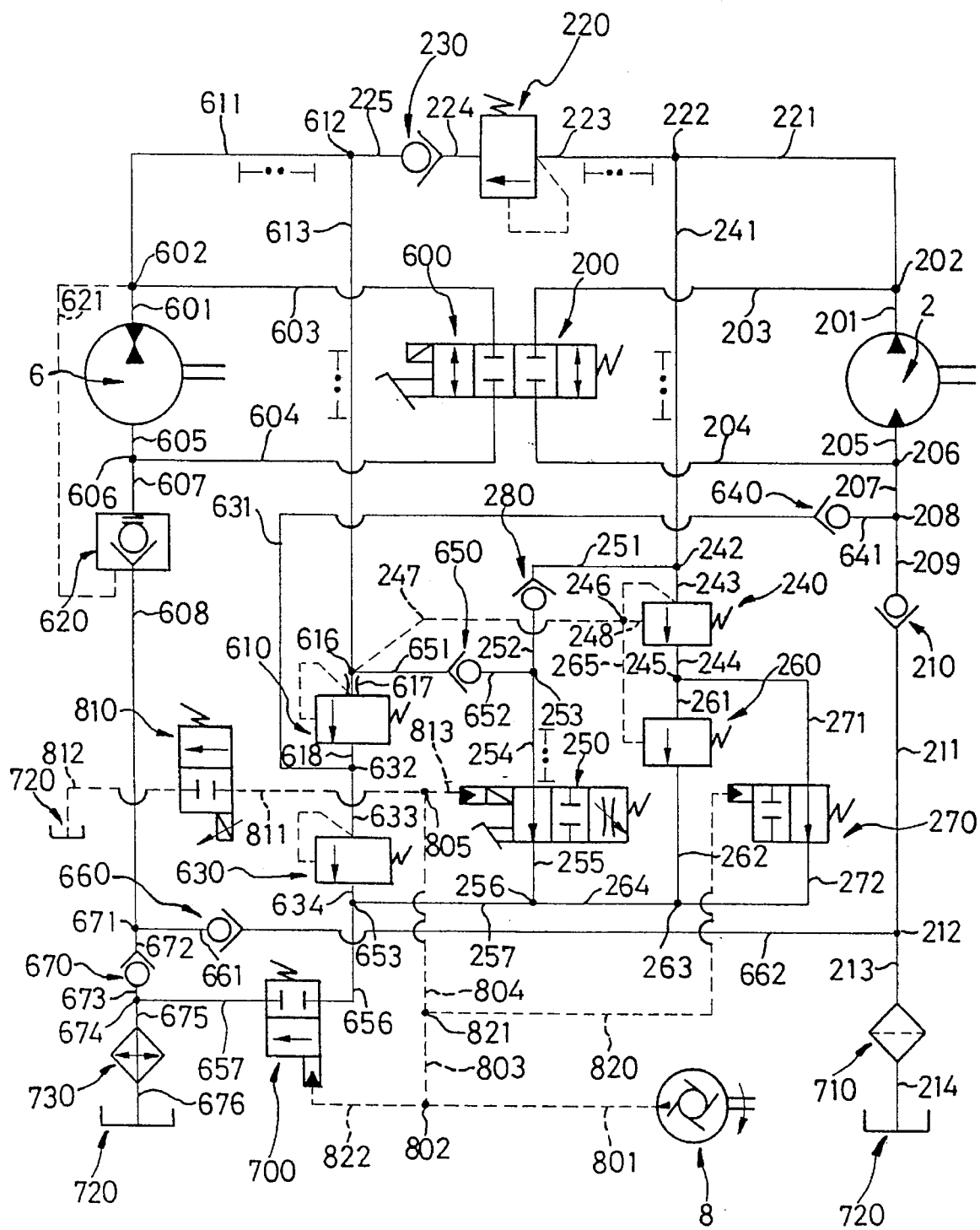
FIG. 4F is a schematic diagram of the oil system of FIG. 4, wherein the gear reduction ratio is 1:1.

FIG. 4F illustrates the oil path system when the torque load ratio of the gear box is 1:1, in which the power transmission in the third power transmission circuit of the compound planetary gear train 9 is completely stopped and is completely shifted to the second power transmission circuit. This is because the braking members and the braking pumps therein are all completely braked. It is appreciated that the working fluid in oil paths 601, 611, 225, 613, 201, 221, 223, 241, 243, 244, 261, 271, 251, 252, 254, 652, 651, 247, 248, and 265 does not flow.

Figure 4G:
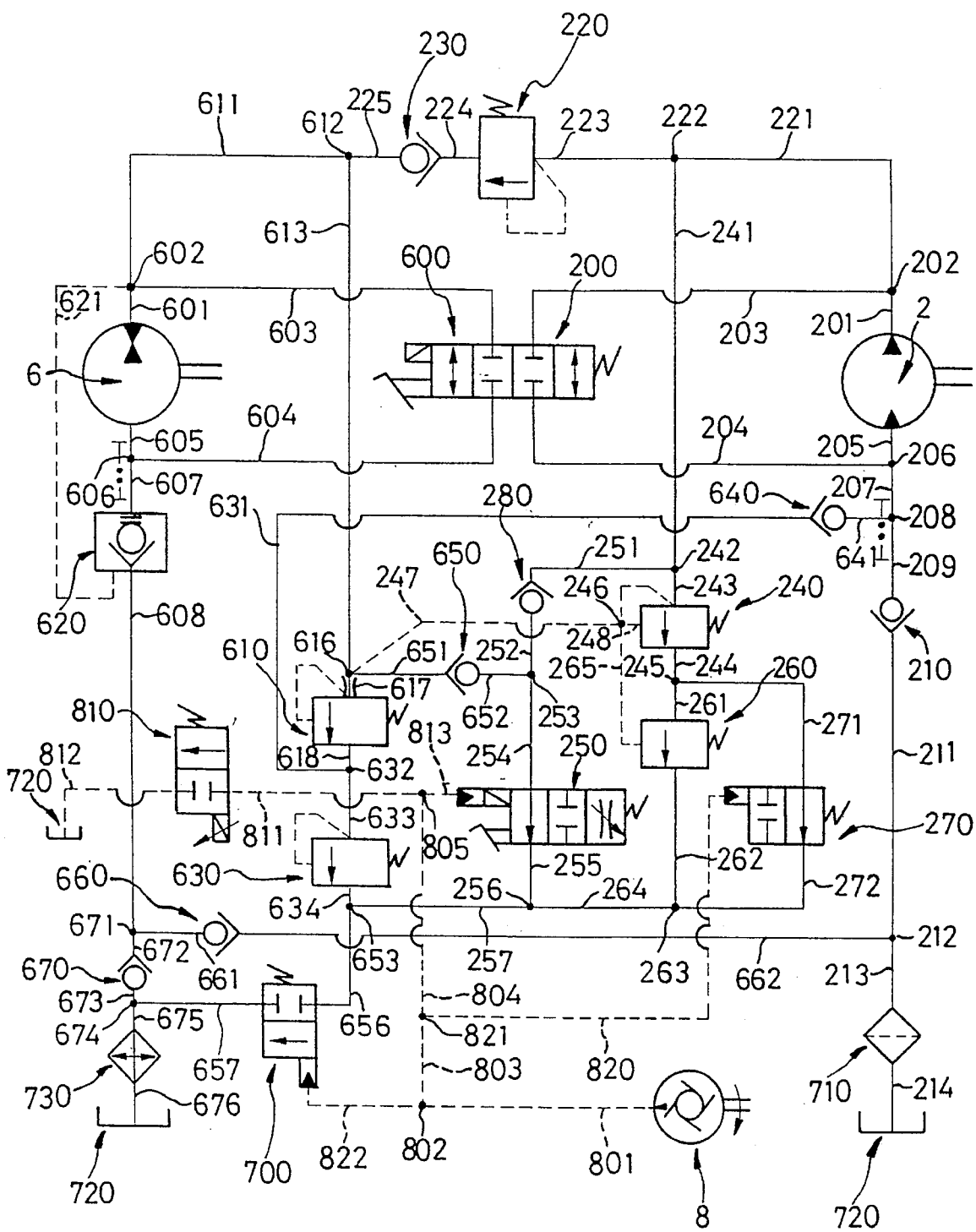
FIG. 4G is a schematic diagram of the oil system of FIG. 4, wherein the vehicle is under an engine braking condition.

FIG. 4G illustrates the oil path system when the vehicle is under engine braking, in which the working fluid in oil paths 604, 605, 607, 204, 205, 207, 209, and 641 does not flow. When the feeding direction of the inertial force is reversed, the braking direction is also reversed.

3. Second Embodiment of the Invention

Figure 2:
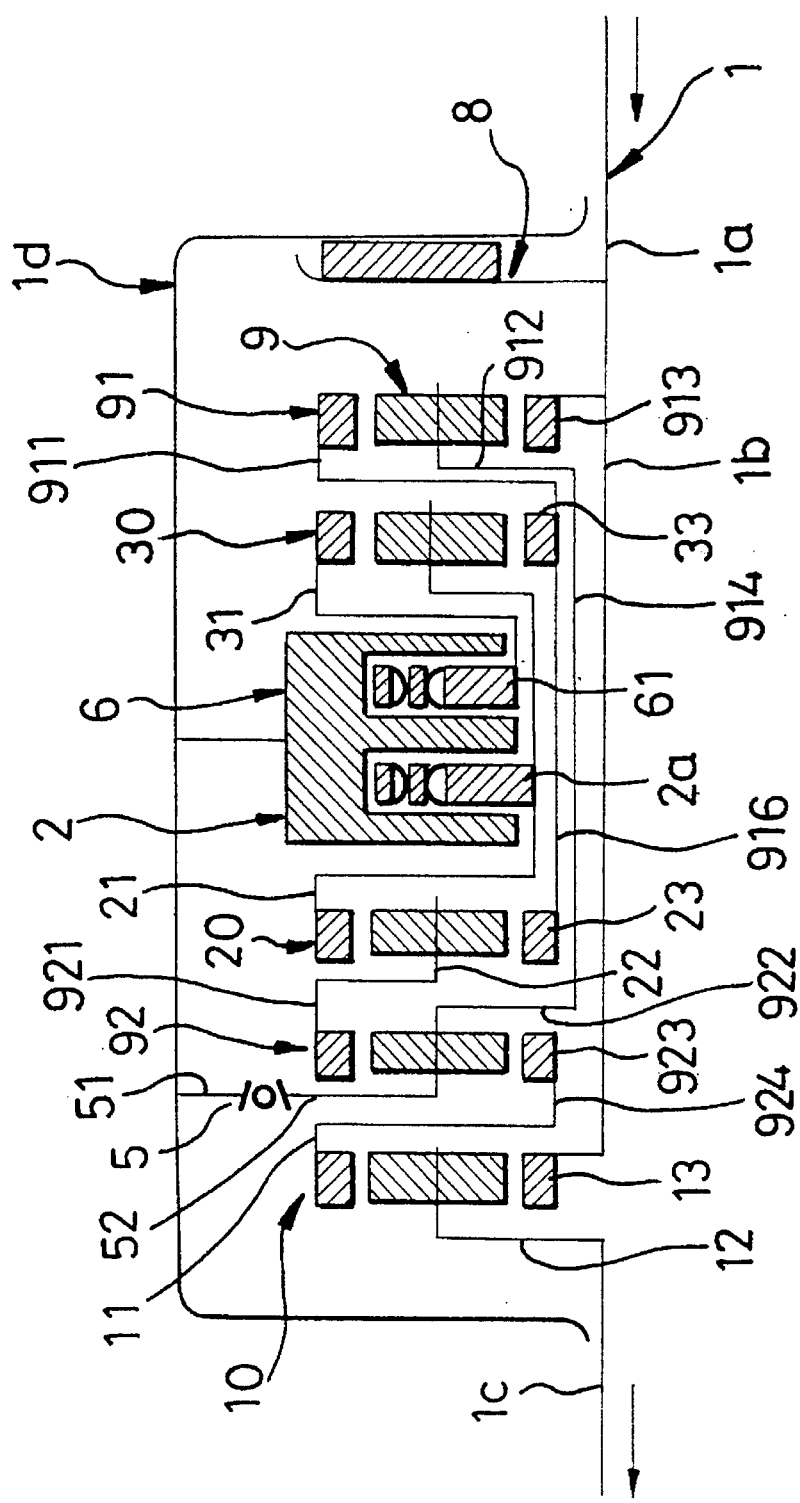
FIG. 2 is a schematic cross-sectional view of a second embodiment of an apparatus for torque-converter clutch transmission in accordance with the present invention.

FIG. 2 illustrates a second embodiment of a torque converter in accordance with the present invention. The torque converter comprises a braking pump 2 comprising an outer casing fixedly mounted to an inner wall of a gear box 1d and a rotor shaft 2a, a transitional braking pump 6 comprising an outer casing fixedly mounted to the inner wall of the gear box 1d and a rotor shaft 61, an oil path system, a one-way clutch 5 having a first end 51 fixedly mounted to the inner wall of the gear box 1d and a second end 52 which is rotatable in one direction.

The torque converter further comprises a final output planetary gear 10, first and second transitional planetary gears 20 and 30, and a compound planetary gear train 9. The final output planetary gear 10 comprises a sun gear 13 connected to an engine power output shaft 1 and functioning as a driving member, a planetary carrier 12 connected to an output shaft 1c and functioning as a driven member, and a ring gear 11 functioning as a braking member.

The first transition planetary gear 20 comprises a sun gear 23, a planetary carrier 22, and a ring gear 21 connected to the rotor shaft 2a of the braking pump 2. The second transition planetary gear 30 comprises a sun gear 33 connected to the sun gear 23 of the first transition planetary gear 20 via an extension shaft 916, a planetary carrier 32 connected to the ring gear 21 of the first transition planetary gear 20, and a ring gear 31 mounted to the rotor shaft 61 of the transition braking pump 6.

The compound planetary gear train 9 comprises first and second planetary gears 91 and 92 each of which has a sun gear, a planet carrier and a ring gear which are respectively accommodated to function as either a driving member, a driven member, or a braking member therewithin, a driven gear in the second planetary gear relating to a corresponding driving gear in the first planetary gear, a driving gear in the second planetary gear relating to a corresponding driven gear in the first planetary gear, and a braking gear in the second planetary gear relating to a corresponding braking gear in the first planetary gear.

In the first planetary gear 91, the sun gear 913 is mounted on the engine power input shaft 1, the ring gear 911 is connected to the sun gear 33 of the second transition planetary gear 30, and the planetary carrier 912 is connected to the planetary carrier 922 of the second planetary gear 92 via an extension shaft 914.

In the second planetary gear 92, the planetary carrier 922 is connected to the second end 52 of the one way clutch 5, the sun gear 923 is connected to the ring gear 11 of the final output planetary gear 10, and the ring gear 921 is connected to the planetary carrier 22 of the first transition planetary gear 2. The compound planetary gear train 9 have a gear reduction ratio of 1:1.

A sensing means, e.g., a centrifugal pump 8, is mounted on the engine power output shaft 1 for sensing rotation speed of the engine power output shaft 1 and outputting predetermined amounts of pressurized working fluid responsive to the rotation speed of the engine power output shaft 1 to control a disengagement valve 250 for braking the braking pump 2 which, in turn, brakes the braking members of the planetary gears, thereby obtaining a transmission.

If necessary, two braking pumps 2 may be used and a rotor shaft of one of the two braking pumps 2 is connected to an extension shaft of the ring gear of the first transition planetary gear 20 and a rotor shaft of the other braking pump 2 is connected to an extension shaft of the ring gear 921 (the braking member) of the compound planetary gear train 9.

In the case that only one braking pump 2 is used, three stepped gear reduction ratios are provided, i.e., a gear reduction ratio of 2:1 for a second gear, a gear reduction ratio of 1.5:1 for a third gear, and a gear reduction ratio of 1:1 for a fourth gear. In the case that two braking pumps 2 are used, four stepped gear reduction ratios are provided, i.e., a fourth gear reduction ratio of 3:1 for a first gear is provided in addition to the three above-mentioned gear reduction ratios. And in both cases a 90% to 100% of transmission efficiency is obtained while the diagram representing the transmission efficiency is in the form of a serrated curve. The rotor shaft 2a of the braking pump 2 has two directions during the conversion of torque, first in one direction for a relatively high torque condition and then in the opposite direction for a relatively low torque condition, and therefore the control direction for the oil path system is different.

Figure 5:
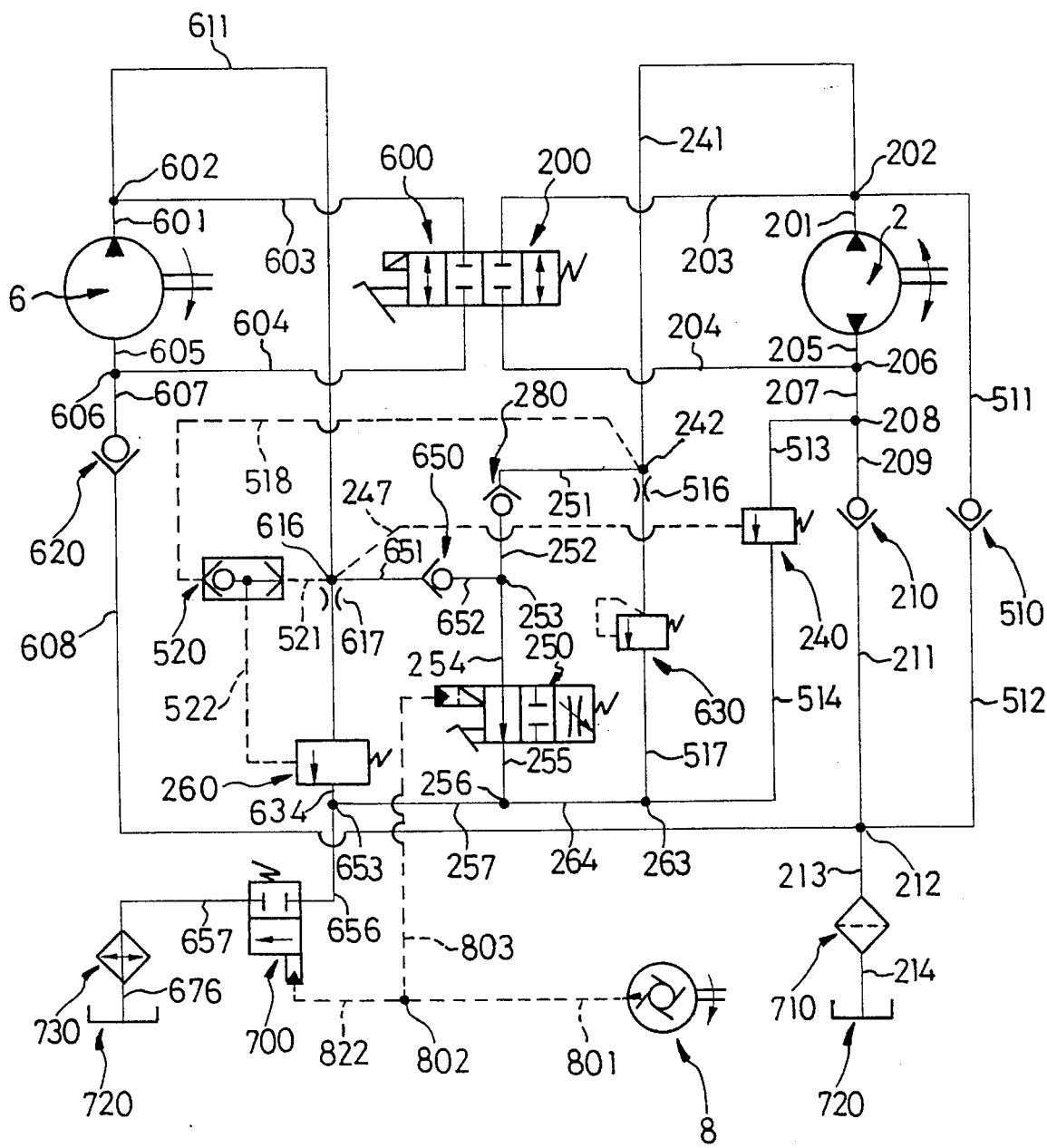
FIG. 5 is a schematic diagram of an oil system of the second embodiment in accordance with the present invention.

Referring to FIG. 5, the oil path system for the third embodiment includes an oil circuit for the braking pump 2 which, in turn, includes a first oil path 201 having a first end communicated to a first port of the braking pump 2 (the first port serves as an outlet when the braking pump 2 performs its braking function) and a second end communicated to a first joint 202, a second oil path 241 having a first end communicated to the first joint 202 and a second end communicated to a second joint 242, a third oil path 251 having a first end communicated to the second joint 242 and a second end communicated to an inlet of a check valve 280, a fourth oil path 252 having a first end communicated to an outlet of the check valve 280 and a second end communicated to a third joint 253, a fifth oil path 254 having a first end communicated to the third joint 253 and a second end communicated to an inlet of a disengagement valve 250, a sixth oil path 255 having a first end communicated to an outlet of the disengagement valve 250 and a second end communicated to a fourth joint 256, a seventh oil path 257 having a first end communicated to the fourth joint 256 and a second end communicated to a fifth joint 653, an eighth oil path 517 having a first end communicated to an outlet of a high pressure relief valve 630 and a second end communicated to a sixth joint 263, a ninth oil path 264 having a first end communicated to the sixth joint 263 and a second end communicated to the fourth joint 256, and a tenth oil path 205 having a first end communicated to a second port of the braking pump 2 (the second port serves as an inlet when the braking pump 2 performs its braking function) and a second end communicated to a seventh joint 206.

The oil circuit for the braking pump 2 further includes an eleventh oil path 207 having a first end communicated to the seventh joint 206 and a second end communicated to an eighth joint 208, a twelfth oil path 209 having a first end communicated to the eighth joint 208 and a second end communicated to an outlet of a check valve 210, a thirteenth oil path 211 having a first end communicated to an inlet of the check valve 210 and a second end communicated to a ninth joint 212, a fourteenth oil path 213 having a first end communicated to the ninth joint 212 and a second end communicated to an outlet of an oil filter 710 an inlet of which is communicated to an oil tank 720 via an oil path 214, a fifteenth oil path 511 having a first end communicated to the first joint 202 and a second end communicated to an outlet of a check valve 510, a sixteenth oil path 512 having a first end communicated to an inlet of the check valve 510 and a second end communicated to the ninth joint 212, a seventeenth oil path 513 having a first end communicated to the eighth joint 208 and a second end communicated to an inlet of a low pressure relief valve 240, an eighteenth oil path 514 having a first end communicated to an outlet of the low pressure relief valve 240 and a second end communicated to the sixth joint 263, a first external guiding oil path 247 having a first end communicated to a tenth joint 616 and a second end communicated to an inlet of a valve guiding chamber of the low pressure relief valve 240, a second external guiding oil path 518 having a first end communicated to the second joint 242 and a second end communicated to a first inlet of a high pressure priority type shuttle check valve 520, and a third external guiding oil path 522 having a first end communicated to an Outlet of the high pressure priority type shuttle check valve 520 and a second end communicated to an inlet of a valve guiding chamber of a mediate pressure relief valve 260.

The oil path system further includes a nineteenth oil path 601 having a first end communicated to a first port of the transitional braking pump 6 (the first port serves as an outlet when the transitional braking pump 6 performs its braking function) and a second end communicated to an eleventh joint 602, a twentieth oil path 611 having a first end communicated to the eleventh joint 602 and a second end communicated to the tenth joint 616, a twenty-first oil path 651 having a first end communicated to the tenth joint 616 and a second end communicated to an inlet of a check valve 650, a twenty-second oil path 652 having a first end communicated to an outlet of the check valve 650 and a second end communicated to the third joint 253, a throttling oil path 617 having a first end communicated to the tenth joint 616 and a second end communicated to an inlet of the mediate pressure relief valve 260, a twenty-third oil path 634 having a first end communicated to an outlet of the mediate pressure relief valve 260 and a second end communicated to the fifth joint 653, a twenty-fourth oil path 656 having a first end communicated to the fifth joint 653 and a second end communicated to an inlet of a shut-off valve 700 for parking, a twenty-fifth oil path 657 having a first end communicated to an outlet of the shut-off valve 700 and a second end communicated to an inlet of a cooler 730 communicated to the oil tank 720 via an oil path 676, a twenty-sixth oil path 605 having a first end communicated to a second port of the transitional braking pump 6 (the second port serves as an inlet when the transitional braking pump 6 performs its braking function) and a second end communicated to a twelfth joint 606, a twenty-seventh oil path 607 having a first end communicated to the twelfth joint 606 and a second end communicated to an outlet of a check valve 620, a twenty-eighth oil path 608 having a first end communicated to an inlet of the check valve 620 and a second end communicated to the ninth joint 212, a fourth external guiding oil path 521 having a first end communicated to the tenth joint 616 and a second end communicated to a second inlet of the high pressure priority type shuttle check valve 520, a twenty-ninth oil path 801 having a first end communicated to the outlet of the centrifugal pump 8 and a second end communicated to a thirteenth joint 802, a thirtieth oil path 803 having a first end communicated to the second inlet of the valve guiding chamber of the disengagement valve 250 and a second end communicated to the thirteenth joint 802, and a thirty-first oil path 822 having a first end communicated to the thirteenth joint 802 and a second end communicated to the second inlet of the valve guiding chamber of the shut-off valve 700.

The oil circuit further includes a thirty-second oil path 203 having a first end communicated to the first joint 202 and a second end, a front manual valve 200 for neutral gear having a first port communicated to the second end of the thirty-second oil path 203 and a second port and being opened when a change in the gear is required, a thirty-third oil path 204 having a first end communicated to the second port of the front manual valve 200 and a second end communicated to the seventh joint 206, a thirty-fourth oil path 603 having a first end communicated to the eleventh joint 602 and a second end;, a rear manual valve 600 for neutral gear having a first port communicated to the second end of the thirteenth oil path 600 and a second port, the rear manual valve 600 being opened when a change in the gear is required, and a thirty-fifth oil path 604 having a first end communicated to the second port of the rear manual valve 600 and a second end communicated to the twelfth joint 606. The structure and operation of the front and rear manual valves 200 and 600 are the same as those described in the first embodiment and therefore is not further described.

The inlet and outlet of the disengagement valve 250 for idling are respectively communicated to the second end of the fifth oil path 254 and the first end of the sixth oil path 255. The disengagement valve 250, when the engine is under an idling condition, is opened under the action of a spring mounted therein. When the engine rotates in a speed higher than the idling speed, the valve 250 is closed within a relatively short time under the action of a sensing means (e.g., a centrifugal pump) which senses the rotational speed of the engine. The oil circuit of the braking pump 2 for free rotation is completely closed, thereby providing an engaged status for starting under a high gear reduction ratio. If the torque conversion ratio of the gear box 1*d* is high (e.g., when the gear reduction ratio is between 3:1 to 2:1), proper pressure release is effected by the high pressure relief valve 630. Similarly, the oil circuit of the transitional braking pump 6 is also closed, yet the working fluid in the second oil path 241 may be sucked into the mediate pressure relief valve 260 via external guiding oil paths 522 and 518, thereby forcing the mediate pressure relief valve 260 to completely open when the gear reduction ratio is between 3:1 to 2:1. Thus, a free rotation without any load is obtained during such gear reduction ratio.

The inlet and outlet of the high pressure relief valve 630 are respectively communicated to the second end of the throttling oil path 516 and the first end of the eighth oil path 517. This high pressure relief valve 630 provides a pressure release function when the gear reduction ratio is high, e.g., between 3:1 to 2:1, thereby allowing the gear box to be retained at a high gear reduction ratio when needed.

The inlet and outlet of the mediate pressure relief valve 260 are respectively communicated to the second end of the throttling oil path 617 and an outlet communicated to the first end of the twenty-third oil path 634. When the gear reduction ratio of the gear box is between 3:1 to 2:1, the working fluid is sucked into the valve guiding chamber of the mediate pressure relief valve 260 via the external guiding oil paths 518 and 522 and thus completely open the mediate pressure relief valve 260 to provide a load-free circuit. However, when the gear reduction ratio of the gear box 1 is between 2:1 to 1.5:1, the working fluid is sucked via the external guiding oil path 611 and thus controls the pressure releasing value of the mediate pressure relief valve 260, thereby allowing the gear box 1 to remain at a desired gear reduction ratio between 2:1 to 1.5:1.

The inlet and outlet of the low pressure relief valve 240 are respectively communicated to the second end of the seventeenth oil path 513 and the first end of the eighteenth oil path 514, and the inlet of the valve guiding chamber of the low pressure relief valve 240 is communicated to the second end of the first external guiding oil path 247. When the gear reduction ration of the gear box 1 is between 2:1 to 1:1, the guiding valve chamber of valve 240 may suck working fluid from the twentieth oil path 611 and thus controls the pressure release value of the valve 240. When the gear reduction ratio is between 2:1 to 1.5:1, the valve 240 is completely opened and thus provides a circuit without any load. When the gear reduction ratio is between 1.5:1 to 1:1, the valve 240 is partially closed and thus controls the amount of working fluid to be released, thereby providing a braking effect to a various extent to the associated braking member.

Thus, the gear reduction ratio of the gear box may be retained at a desired value in the range of 1.5:1 to 1:1.

The first inlet, second inlet, and outlet of the high pressure priority type shuttle check valve 520 are respectively communicated to the second end of the external guiding oil path 518, a second inlet communicated to the second end of the fourth external guiding oil path 521, and the first end of the external guiding oil path 522. The high pressure priority type shuttle check valve 520 further includes a shuttle body therein. When the pressure value in the first inlet is greater than that in the second inlet by a pre-determined value, the shuttle body closes a reverse oil path in the second inlet. To the contrary, when the pressure value in the second inlet is greater than that in the first inlet by a pre-determined value, the shuttle body closes a reverse oil path in the first inlet.

Referring now to FIGS. 5A through 5F, again, arrows "→" indicate the flow path of working fluid due to siphon effect, arrows $-\cdot\rightarrow$ indicate the flow path of released working fluid, arrows $-\cdots\rightarrow$ indicate the flow path of high pressure working fluid, and symbol ⊢---⊣ indicate the blocked area where the high pressure working fluid therein does not flow.

Figure 5A:
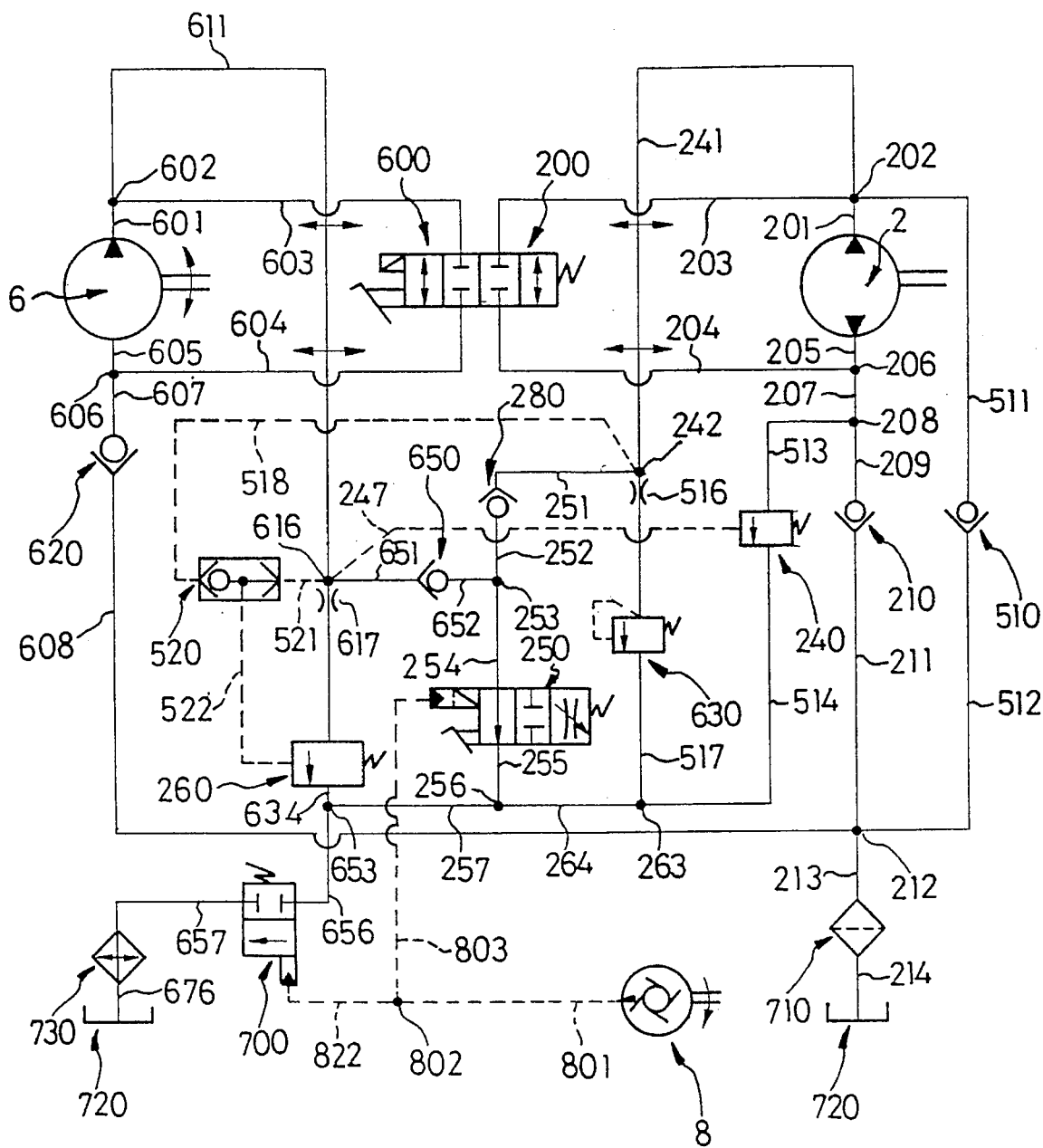
FIG. 5A is a schematic diagram of the oil system of FIG. 5, wherein the arrows show the path of the working fluid when under a neutral gear.

Referring to FIG. 5A, when in neutral gear, the manual switches 200 and 600 are opened, each of braking pumps 2 and 6 may rotate freely and thus generate the desired neutral gear for manual gear shifting.

Figure 5B:
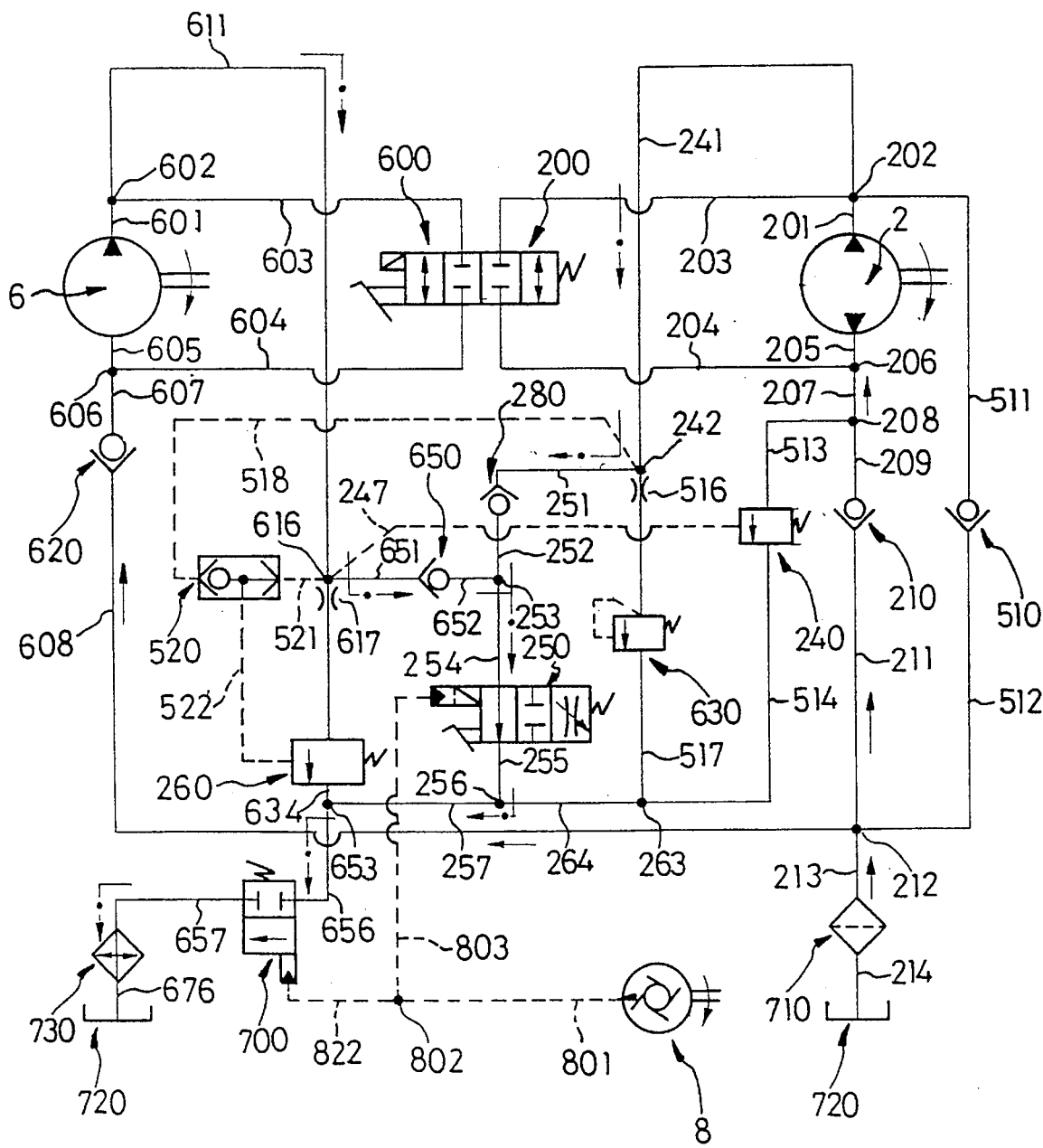
FIG. 5B is a schematic diagram of the oil system of FIG. 5, wherein the arrows show the path of the working fluid when under an engine idling condition.

Referring to FIG. 5B, when the engine is under an idling condition, the disengagement valve 250 is not closed and the working fluid in the oil path system is not throttled, and none of the braking pumps and the braking members are effectively braked, therefore the disengagement valve 250 is in a disengaged status.

Figure 5C:
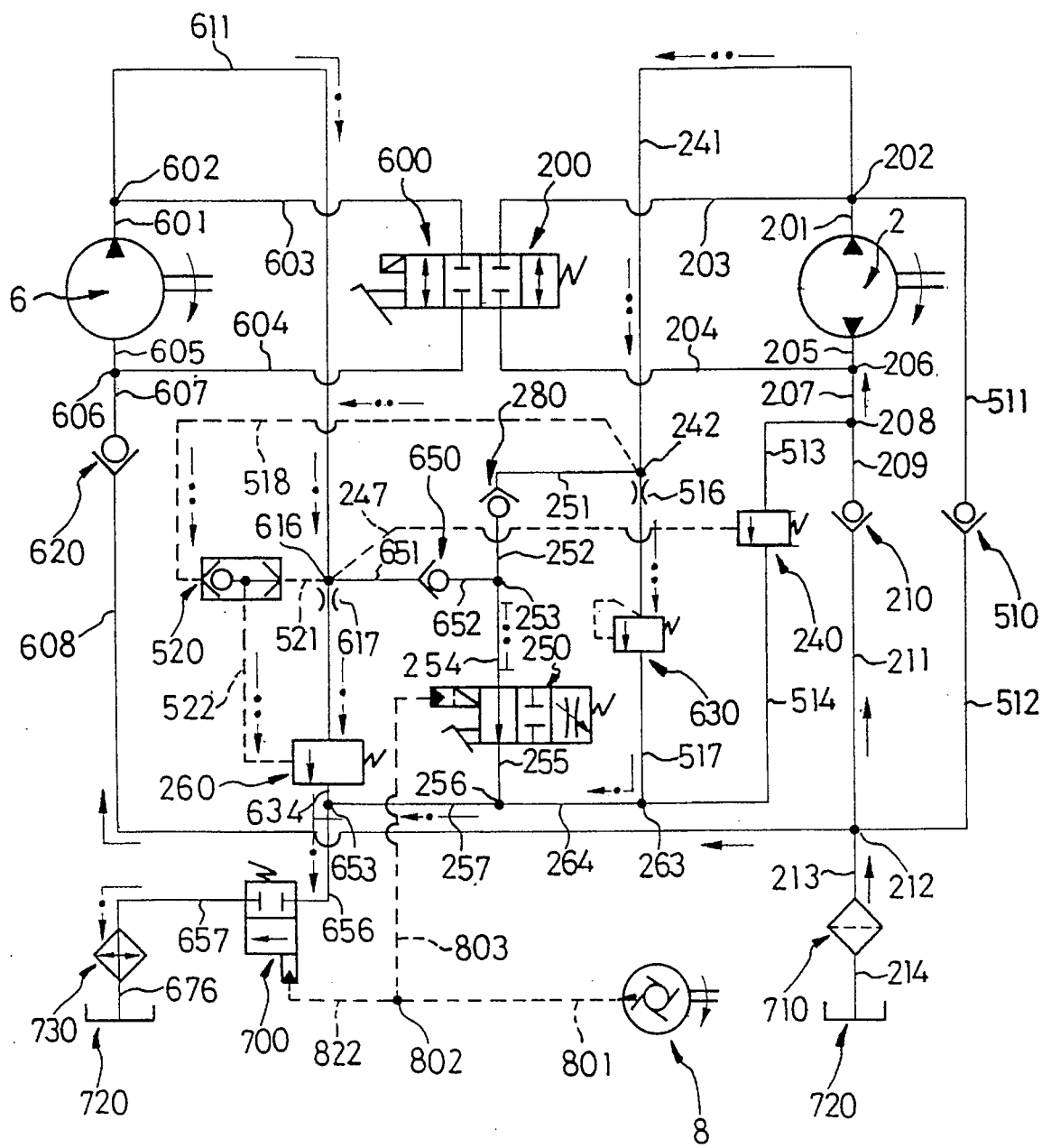
FIG. 5C is a schematic diagram of the oil system of FIG. 5, wherein the arrows show the path of the working fluid when the torque load ratio of the gear box is in a range of 3:1 to 2:1.

Referring to FIG. 5C, when the rotational speed of the engine is higher than the idling speed, the disengagement valve 250 is completely closed and torque load ratio of the gear box 1 is between 3:1 to 2:1. In this instance, the braking pump 2 may obtain at least ⅔ of its maximum braking effect, thereby obtaining an effective transmission under high gear reduction ratio between 3:1 to 2:1 responsive to the load of the gear box. When the gear reduction ratio becomes 2:1, the braking pump 2 is stopped, and when the gear reduction ratio is lower than 2:1, the braking pump 2 is driven in a direction opposite to the original one, while the pressure that operates the mediate pressure relief valve 20 comes from the working fluid of the second oil path 241.

Figure 5D:
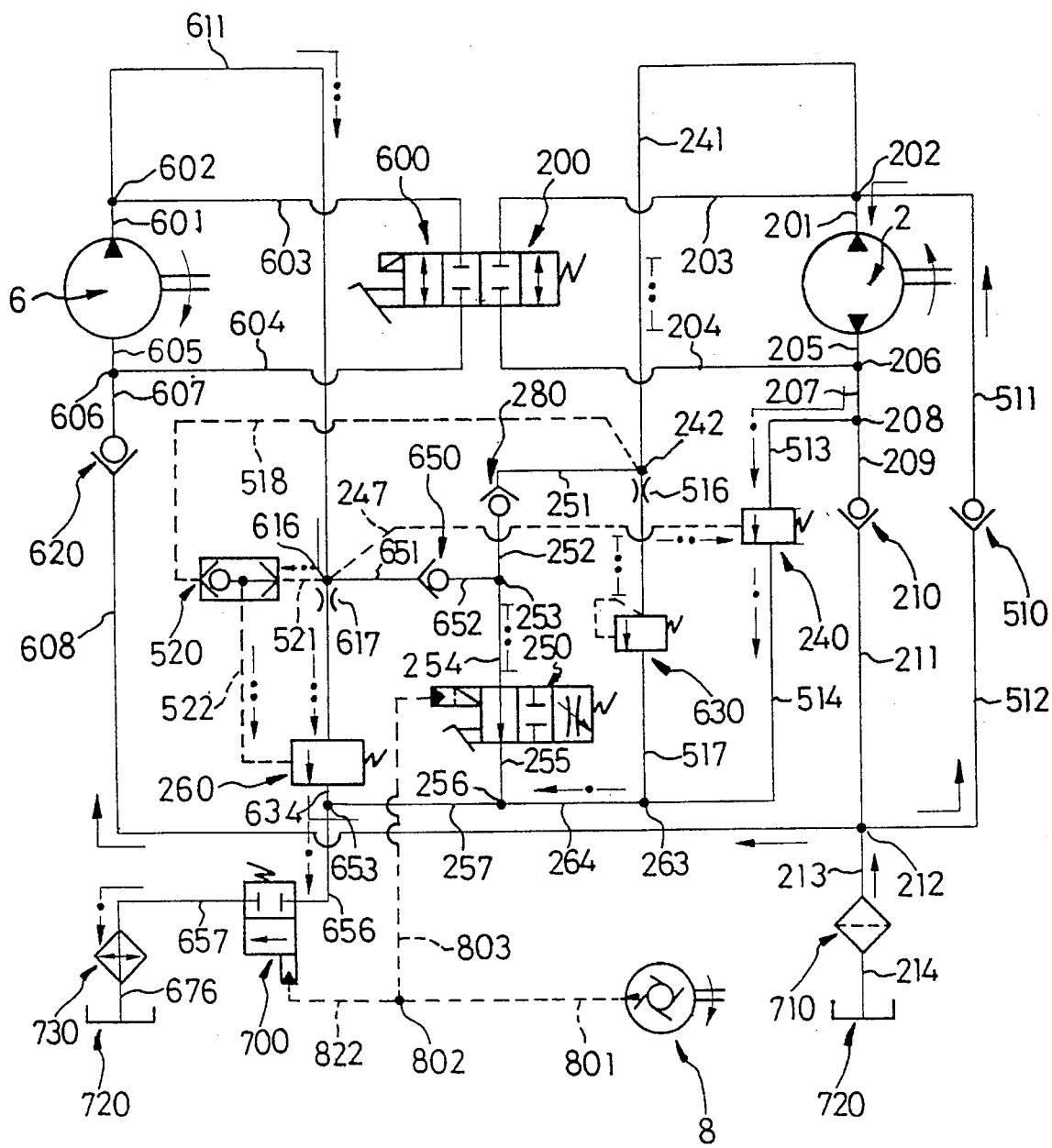
FIG. 5D is a schematic diagram of the oil system of FIG. 5, wherein the arrows show the path of the working fluid when the torque load ratio of the gear box is in a range of 2:1 to 1.5:1.

FIG. 5D illustrates the oil path system when the torque load ratio of the gear box is between 2:1 to 1.5:1 while the gear reduction ratio is in a range of 2:1 to 1.5:1 responsive to the load of the engine. The braking pump 2 is driven to rotate in a reverse direction while the pressure that operates the mediate pressure relief valve 260 comes from the working fluid of the twentieth oil path 611.

Figure 5E:
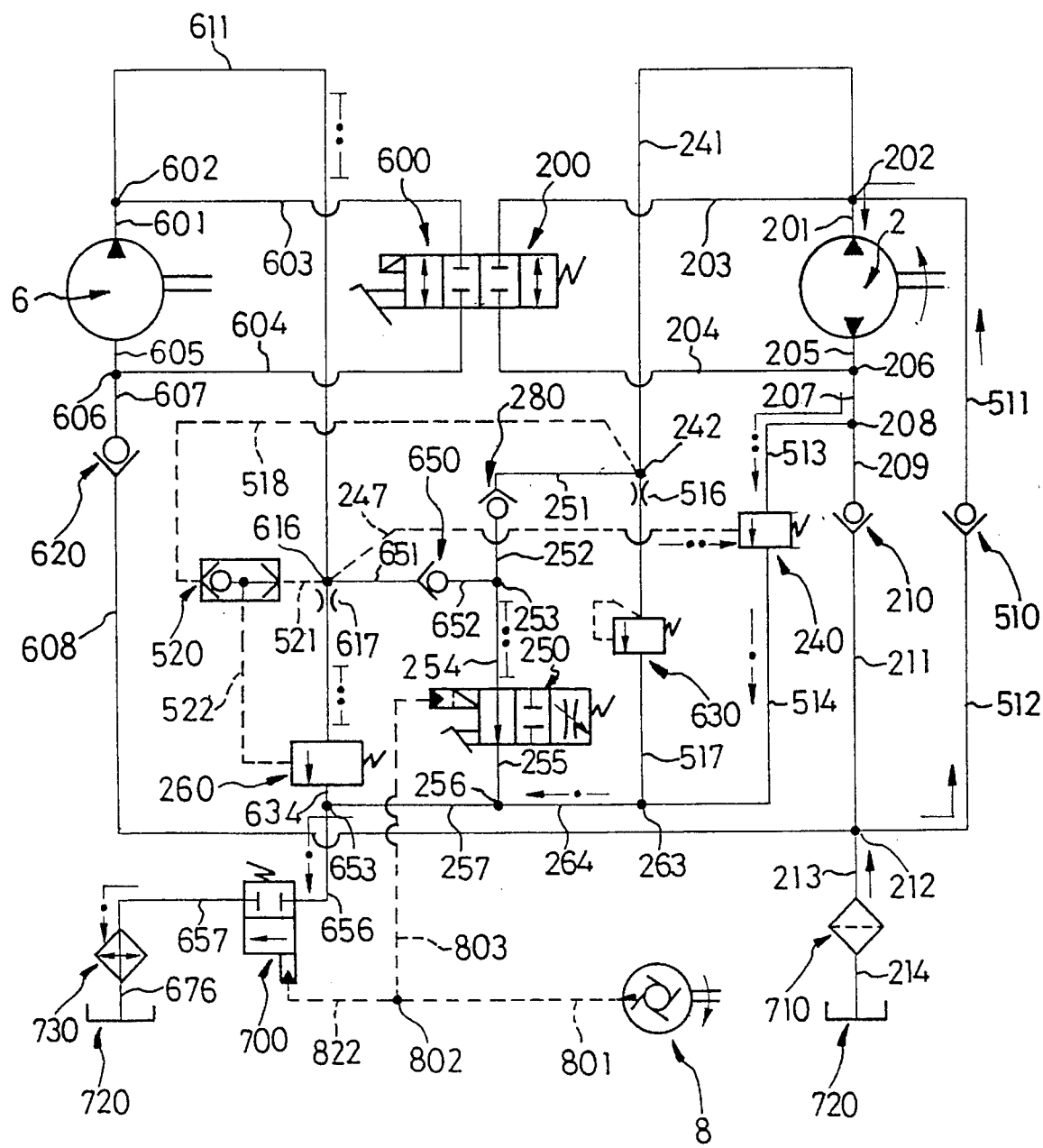
FIG. 5E is a schematic diagram of the oil system of FIG. 5, wherein the arrows show the path of the working fluid when the torque load ratio of the gear box is in a range of 1.5:1 to 1:1.

FIG. 5E illustrates the oil path system of the working fluid in which the torque load ratio of the gear box is 2:1 to 1.5:1 while the gear reduction ratio is in a range of 1.5:1 to 1:1 responsive to the load of the engine. The transitional braking pump 6 is completely braked, while the braking pump 2 is braked to a various extent responsive to the load of the gear box. Furthermore, when the torque load ratio of the gear box is 1.5:1, a second power transmission circuit of the compound planetary gear train 9 obtains an effective power transmission, while the power of a third power transmission circuit of the compound planetary gear train 9 is gradually shifted to the second power transmission circuit, and the pressure that operates the low pressure relief valve 240 comes from the working fluid of the twentieth oil path 611.

Figure 5F:
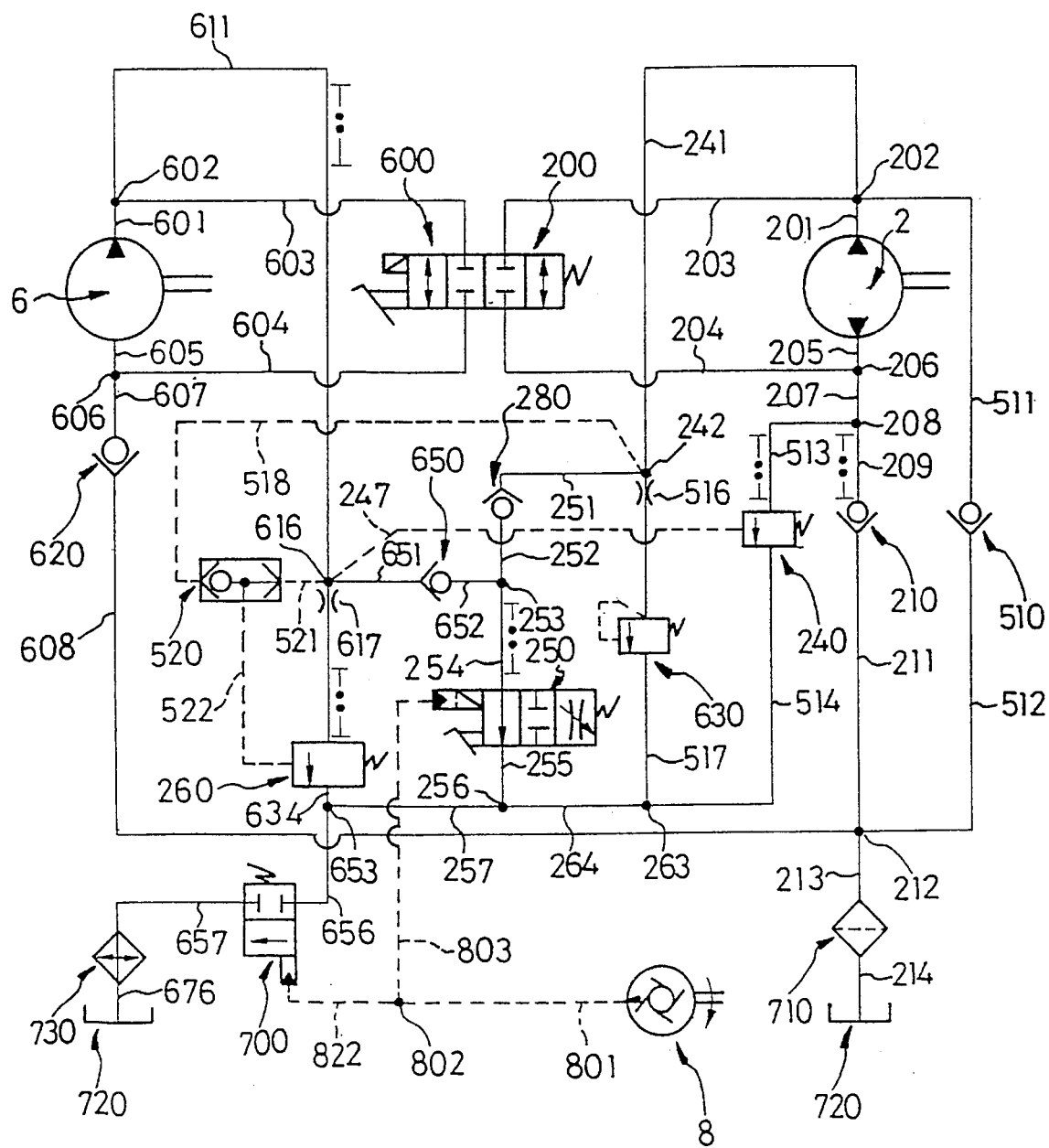
FIG. 5F is a schematic diagram of the oil system of FIG. 5, wherein the arrows show the path of the working fluid when the torque load ratio of the gear box is 1:1.

FIG. 5F illustrates the oil path system when the torque load ratio of the gear box 1 is 1:1, while the reverse rotation of the braking pump 2 and is completely stopped. The power transmission in the third power transmission circuit is completely stopped and the second power transmission circuit takes over as the associated braking members are completely braked. The working fluid in oil paths 601, 611, 617, 521, 522, 651, 652, 252, 254, 247, 513, 209, 207, and 205 does not flow.

Figure 5G:
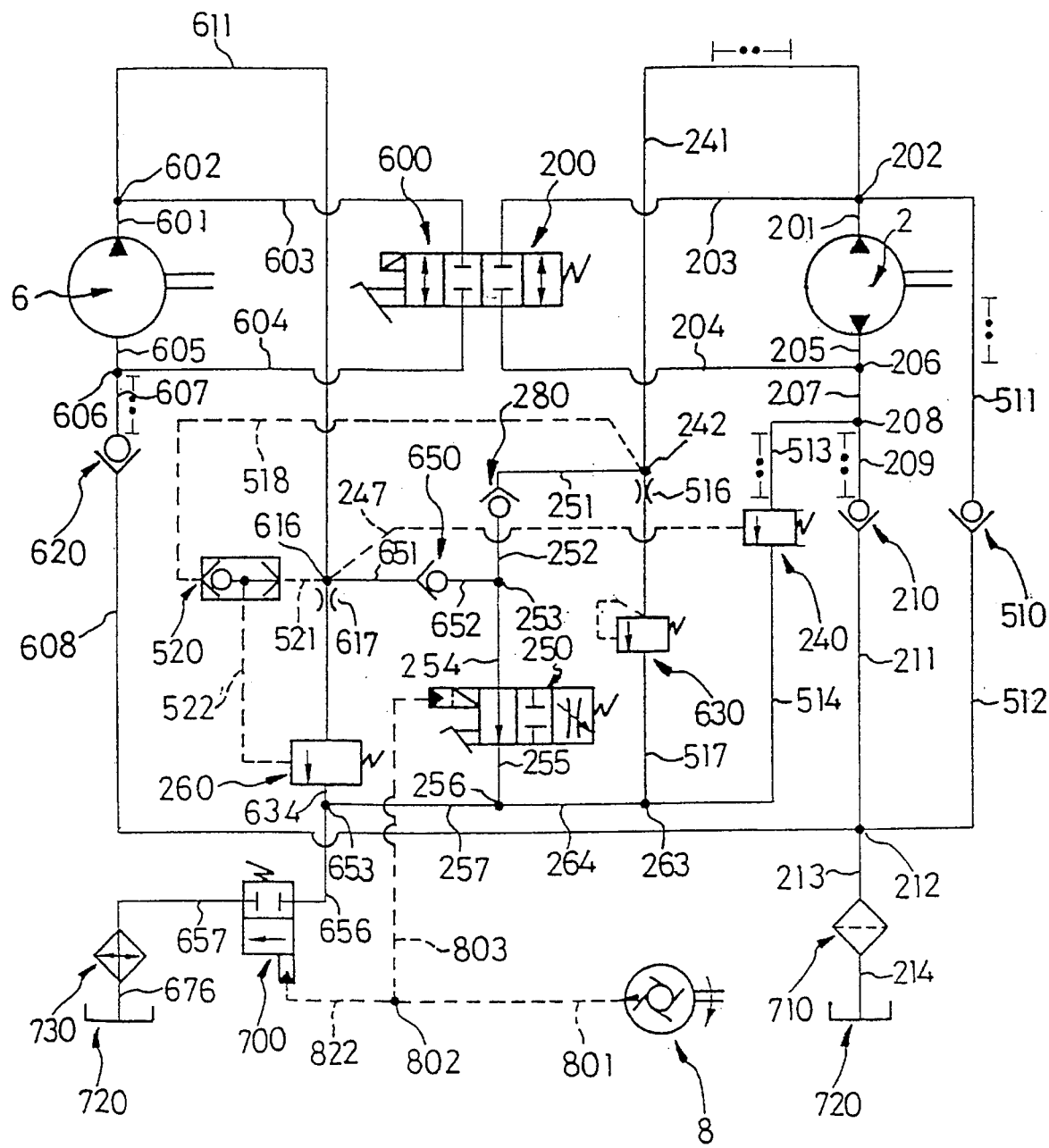
FIG. 5G is a schematic diagram of the oil system of FIG. 5 when under an engine braking condition.

FIG. 5G illustrates the oil path system when the vehicle is under engine braking condition in which the oil circuit is closed in either direction. When the feeding direction of the inertial force is reversed, the braking direction is also reversed. The working fluid in oil paths 605, 607, 511, 201, 241, 516, 251, 252, 254, 652, 205, 207, 209, and 513 does not flow.

4. Third Embodiment of the Invention

Referring now to FIG. 3 which illustrates a third embodiment of a torque converter in accordance with the present invention having only two (first and second) power transmission circuits. This embodiment is utilized when a maximum gear reduction ratio of the planetary carrier 12 of the final output planetary gear 10 is below 2:1. If the maximum gear reduction ratio is 2:1, the gear ratio is 1:2:1, therefore, the gear ratio between the driven member and the braking member is 2:1. Accordingly, when the torque conversion ratio of the gear box is slightly below 2:1, the torque conversion ratio of the compound planetary gear train 9 is 1:1 which is the effective engagement point for effective transmission, i.e., the first and second transitional planetary gears in the first embodiment are not required in this embodiment to compensate the reactive force required for high torque conversion. Therefore, the torque converter of this embodiment can be called as elementary type.

The torque converter of the second embodiment in accordance with the present invention includes a final output planetary gear 10 with a gear ratio of 1:2:1. The final output planetary gear 10 includes a sun gear 13 which is connected to a rear section 1b of an engine power output shaft 1 and functions as the driving member, a planetary carrier 12 which is connected to a front section of an output shaft 1c and functions as the driven member which is also the output member, and a ring gear 11 which is connected to a rear sun gear 923 of the compound planetary gear train 9 via a member 924 and functions as the braking member.

The compound planetary gear train 9 includes first and second planetary gears 91 and 92, each of which has a sun gear, a planet carrier and a ring gear which are respectively accommodated to function as either a driving member, a driven member, or a braking member therewithin. A driven gear in the second planetary gear relates to a corresponding driving gear in the first planetary gear. A driving gear in the second planetary gear relates to a corresponding driven gear in the first planetary gear. A braking gear in the second planetary gear relates to a corresponding braking gear in the first planetary gear.

In the first planetary gear 91, the sun gear 913 is mounted on a front section 1a of the engine power output shaft 1 and the planetary carrier 912 is connected to a hollow rotor shaft 2a of a braking pump 2 via a member 918. The second planetary gear 92 includes a planetary carrier 922 fixedly mounted to the inner wall of a gear box 1d and a sun gear 923 connected to the ring gear 11 of the final output planetary gear 10. The first and second planetary gears 91 and 92 share a common ring gear 911.

A sensing means, e.g., a centrifugal pump 8, is mounted on the engine power output shaft 1 for sensing rotation speed of the engine power output shaft 1 and outputting predetermined amounts of pressurized working fluid responsive to the rotation speed of the engine power output shaft 1 to control a disengagement valve 250 for braking the braking pump 2 which, in turn, brakes the braking members of the planetary gears 10, 91, and 92, thereby obtaining a transmission.

In an alternative embodiment, the planetary carrier 922 of the second planetary gear 92 may be connected to the rotor shaft 2a of the braking pump 2 while the planetary carrier 912 of the first planetary gear 91 may be connected to the inner wall of the gear box 1d.

Figure 6:
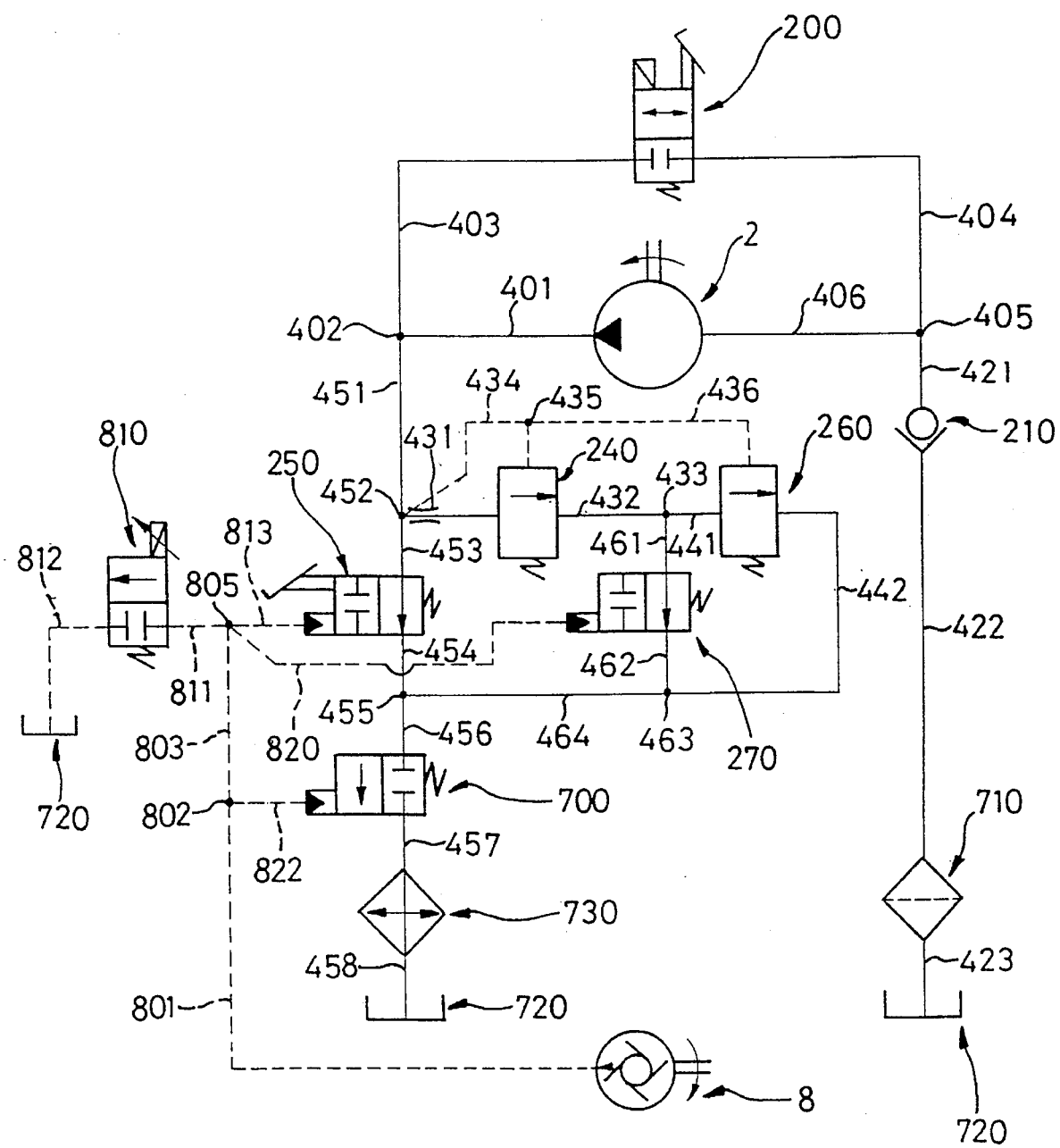
FIG. 6 is a schematic diagram of an oil system of a third embodiment in accordance with the present invention.

Referring to FIG. 6, the oil path system for the second embodiment includes a first oil path 401 having a first end communicated to a first port of the braking pump 2 (the first port serves as an outlet when the braking pump 2 performs its braking function) and a second end communicated to a first joint 402, a second oil path 403 having a first end communicated to the first joint 402 and a second end communicated to a first port of a manual valve 200, a third oil path 404 having a first end communicated to a second port of the manual valve 200 and a second end communicated to a second joint 405, a fourth oil path 406 having first end communicated to the second joint 405 and a second end communicated to a second port of the braking pump 2 (the second port serves as an inlet when the braking pump 2 performs its braking function), a fifth oil path 421 having a first end communicated to the second joint 405 and a second end communicated to an outlet of a check valve 210, a sixth oil path 422 having a first end communicated to an inlet of the check valve 210 and a second end communicated to an outlet of an oil filter 710, a seventh oil path 423 having a first end communicated to an inlet of the oil filter 710 and a second end communicated to an oil tank 720, an eighth oil path 451 having a first end communicated to the first joint 402 and a second end communicated to a third joint 452, a ninth oil path 453 having a first end communicated to the third joint 452 and a second end communicated to an inlet of a disengagement valve 250 for idling, and a tenth oil path 454 having a first end communicated to an outlet of the disengagement valve 250 and a second end communicated to a fourth joint 455.

The oil path system for the second embodiment further includes an eleventh oil path 456 having a first end communicated to the fourth joint 455 and a second end communicated to an inlet of a shut-off valve 700 for parking, a twelfth oil path 457 having a first end communicated to an outlet of the shut-off valve 700 and a second end communicated to an inlet of a cooler 730, a thirteenth oil path 458 having a first end communicated to an outlet of the cooler 730 and a second end communicated to the oil tank 720, a throttling oil path 431 having a first end communicated to the third joint 452 and a second end communicated to an inlet of a low pressure relief valve 240, a fourteenth oil path 432 having a first end communicated to an outlet of the low pressure relief valve 240 and a second end communicated to a fifth joint 433, a fifteenth oil path 441 having a first end communicated to the fifth joint 433 and a second end communicated to an inlet of a mediate pressure relief valve 260, a sixteenth oil path 442 having a first end communicated to an outlet of the mediate pressure relief valve 260 and a second end communicated to a sixth joint 463, a seventeenth oil path 464 having a first end communicated to the sixth joint 463 and a second end communicated to the fourth joint 455, an eighteenth oil path 461 having a first end communicated to the fifth joint 433 and a second end communicated to an inlet of a delay-action switch valve 270, a nineteenth oil path 462 having a first end communicated to an outlet of a delay-action switch valve 270 and a second end communicated to the sixth joint 463, a first external guiding oil path 434 having a first end communicated to the third joint 452 and a second end communicated to a seventh joint 435, and a second external guiding oil path 436 having a first end communicated to the seventh joint 435 and a second end communicated to an inlet of a valve guiding chamber of the mediate pressure relief valve 260.

The structures, functions, and operations of the manual valve 200, the shut-off valve 700, and the delay-action switch valve 270 are identical to those described in the first embodiment and therefore is not further described herein.

The structure, function, and operation of the disengagement valve 250 are substantially the same as those described in the first embodiment and therefore is not further described herein, the only difference is that, in this embodiment, both of the torque conversion of a various extent generated by the braking member (the ring gear 11) of the final output planetary gear 10 during the effective transmission for starting of the vehicle as well as the torque conversion of a various extent generated by the braking member of the compound planetary gear train 9 are solely borne by the braking pump 2. When the disengagement valve 250 is closed under engine idling condition, the working fluid entering the braking pump 2 is completely throttled, more specifically, the ring gear 11 (the braking member) is braked and thus cannot rotate freely such that the power transmission is effected for starting the vehicle.

The operation range for the low pressure relief valve 240 in the second embodiment is different from that in the first embodiment. This is because the normal maximum torque ratio is 2:1 in this embodiment, and, when incorporated in a manual gear box, there is a certain gear ratio when the vehicle is started or the vehicle originally slides (the accelerator is not pressed) with a relatively low speed at a second or third gear and then the accelerator is pressed. Therefore, the operation range of the low pressure relief valve 240 is set under a condition that the torque conversion ratio of the gear box is in a range of 1.5:1 to 1:1. Furthermore, the flux percentage of the working fluid controlled by the low pressure relief valve 240 is the amount of the working fluid outputted by the braking pump 2 which brakes the braking member of the compound planetary gear train 9 to a various extent responsive to the remaining amount of working fluid after the disengagement valve 250 is closed. When the torque conversion ratio of the gear box 1 is 1:1, the low pressure relief valve 240 is completely closed and thus completely brakes the braking member (the planetary carrier 912) of the compound planetary gear train 9, thereby obtaining a gear reduction ratio of 1:1 for the gear box.

The inlet and outlet of the mediate pressure relief valve 260 are respectively communicated to the second end of the fifteenth oil path 441 and the second end of the sixteenth oil path 442, while the inlet of the valve guiding chamber of the mediate pressure relief valve 260 is communicated to the second end of external guiding oil path 436, such that the working fluid in the eighth oil path 451 may be guided thereinto via oil paths 434 and 436, to thereby sense the torque conversion ratio of the gear box so as to control the amount of pressure to be released via the mediate pressure relief valve 260. The operation range of the mediate pressure relief valve 260 is set under a condition that the torque conversion ratio of the gear box is in a range of 2:1 to 1:1 while the delay-action switch valve 270 is closed.

The inlet and outlet of the check valve 270 are respectively communicated to the first end of sixth oil path 422 and the second end of the fifth oil path 421. This valve 270, when the vehicle slides under the action of inertial force, prevents the braking pump 2 from rotating in a reverse direction thereby obtaining an engine braking effect.

The centrifugal pump 8 includes a rotor shaft mounted on a front section 1a of the engine power output shaft 1. An oil circuit system for the centrifugal pump 8 further includes a twentieth oil path 801 having a first end communicated to the outlet of the centrifugal pump 8 and a second end communicated to an eighth joint 802, a twenty-first oil path 822 having a first end communicated to the eighth joint 802 and a second end communicated to an inlet of a valve guiding chamber of the shut-off valve 700, a twenty-second oil path 803 having a first end communicated to the eighth joint 802 and a second end communicated to a ninth joint 805, a twenty-third oil path 813 having a first end communicated to the ninth joint 805 and a second end communicated to an inlet of a valve guiding chamber of the disengagement valve 250, a third external guiding oil path 820 having a first end communicated to the ninth joint 805 and a second end communicated to an inlet of a valve guiding chamber of the delay-action switch valve 270, a high idling speed control valve 810 having an inlet and an outlet and being opened for increasing the idling speed of the engine when needed, a twenty-fourth oil path 811 having a first end communicated to the ninth joint 805 and a second end communicated to the inlet of the high idling speed control valve 810, and a twenty-fifth oil path 812 having a first end communicated to the outlet of the high idling speed control valve 810 and a second end communicated to the oil tank 720. The structure and operation of the centrifugal pump 8 and the high idling speed control valve 810 are the same as those illustrated in the first embodiment and therefore are not further described.

In FIGS. 6A through 6G, arrows "→" indicate the flow path of working fluid due to siphon effect, arrows –·→ indicate the flow path of released working fluid, arrows –··→ indicate the flow path of high pressure working fluid, and symbol ⊢··⊣ indicate the blocked area where the high pressure working fluid therein does not flow.

Figure 6A:
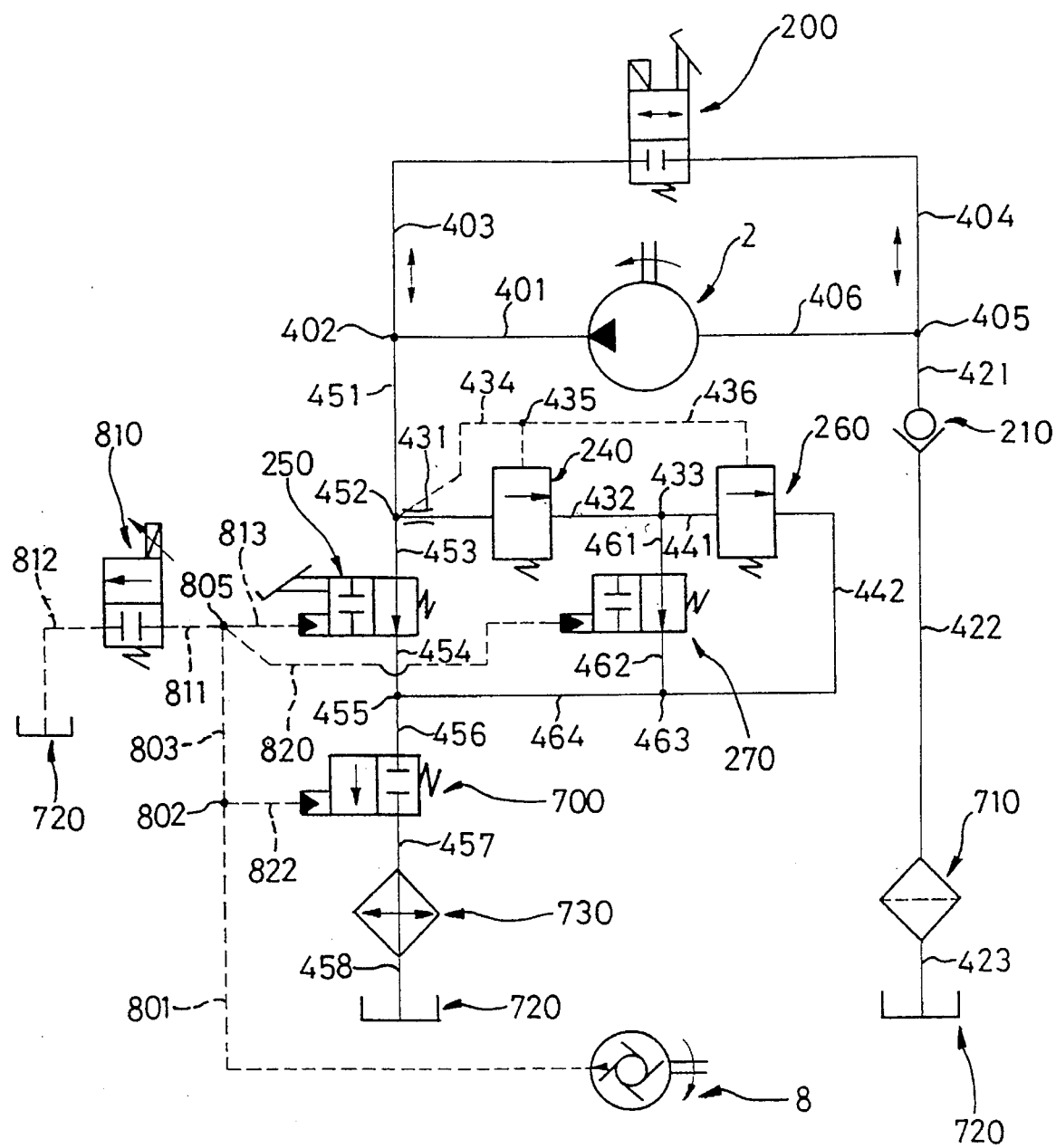
FIG. 6A is a schematic diagram of the oil system of FIG. 6, wherein the arrows show the path of the working fluid when under a neutral gear.

Referring to FIG. 6A, when in neutral gear, the manual switch 200 is opened and the braking pump 2 may rotate freely and thus generate the desired neutral gear for manual gear shifting.

Figure 6B:
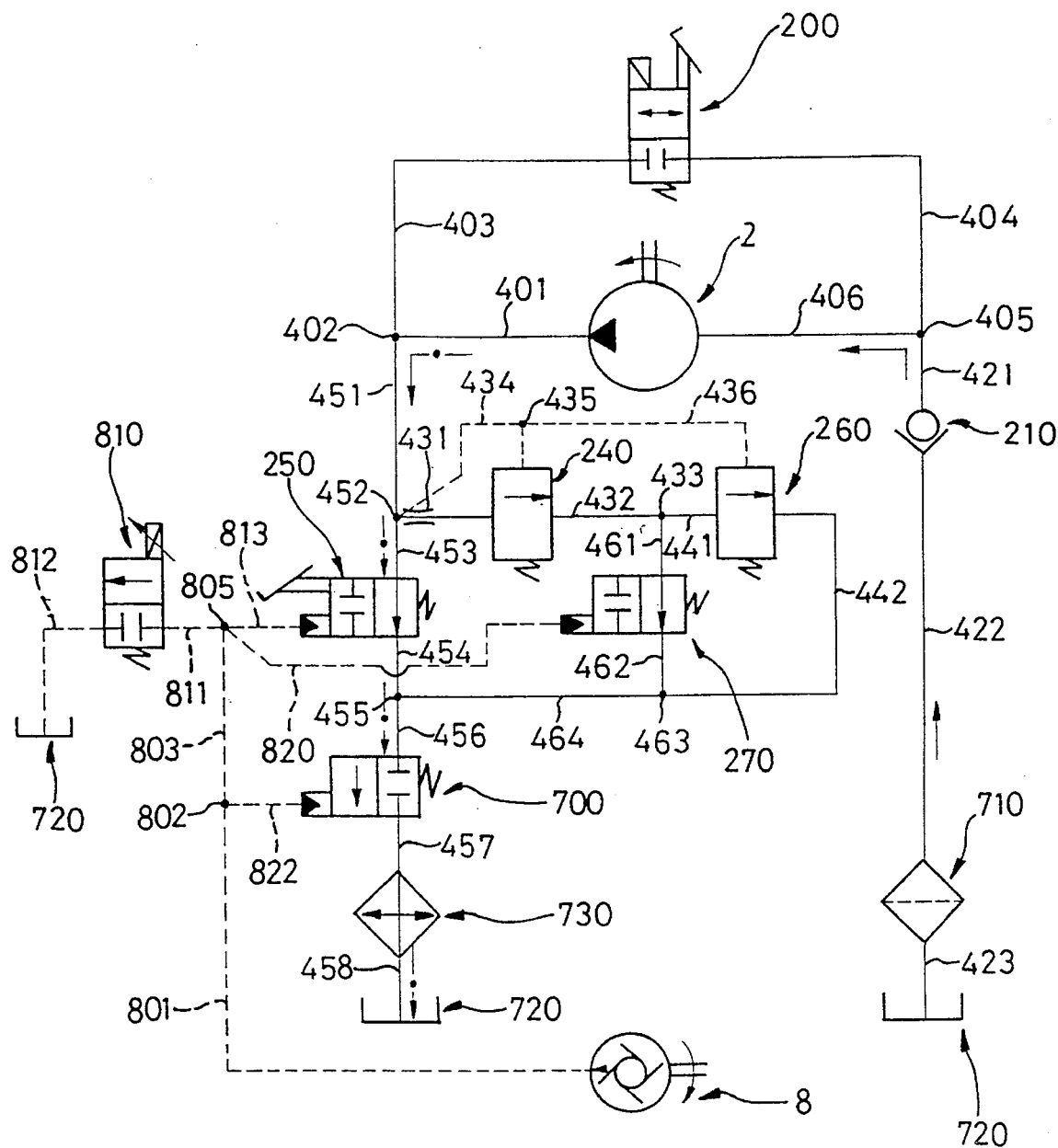
FIG. 6B is a schematic diagram of the oil system of FIG. 6, wherein the arrows show the path of the working fluid when under an engine idling condition.

Referring to FIG. 6B, when the engine is under the idling condition, the disengagement valve 250 is not closed and the flow of the working fluid in the oil circuit is not throttled, while either the braking pump 2 or the braking member is not effectively braked. Therefore, the torque converter is still in a disengaged status.

Figure 6C:
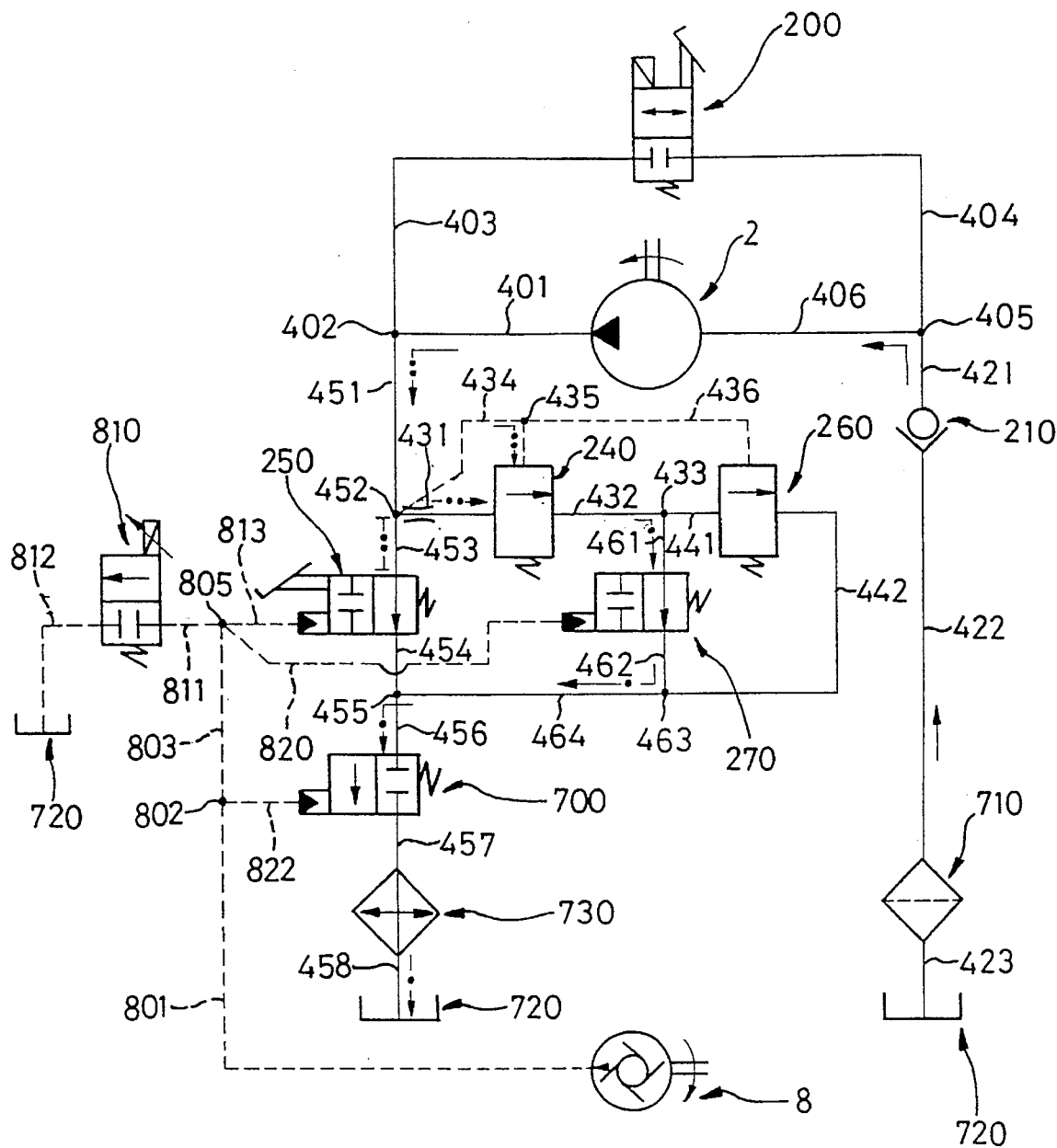
FIG. 6C is a schematic diagram of the oil system of FIG. 6, wherein the rotation speed of the engine is below 1500 r.p.m.

Referring to FIG. 6C, when the rotational speed of the engine is higher than the idling speed and below 1500 r.p.m., the disengagement valve 250 is completely closed. In this instance, the braking pump 2 may obtain at least a half of its maximum braking effect. Thus, the power under high gear reduction ratio for starting may be effectively transmitted, while the gear reduction ratio may be in a range between 2:1 to 1.01:1 responsive to the load of the gear box.

Figure 6D:
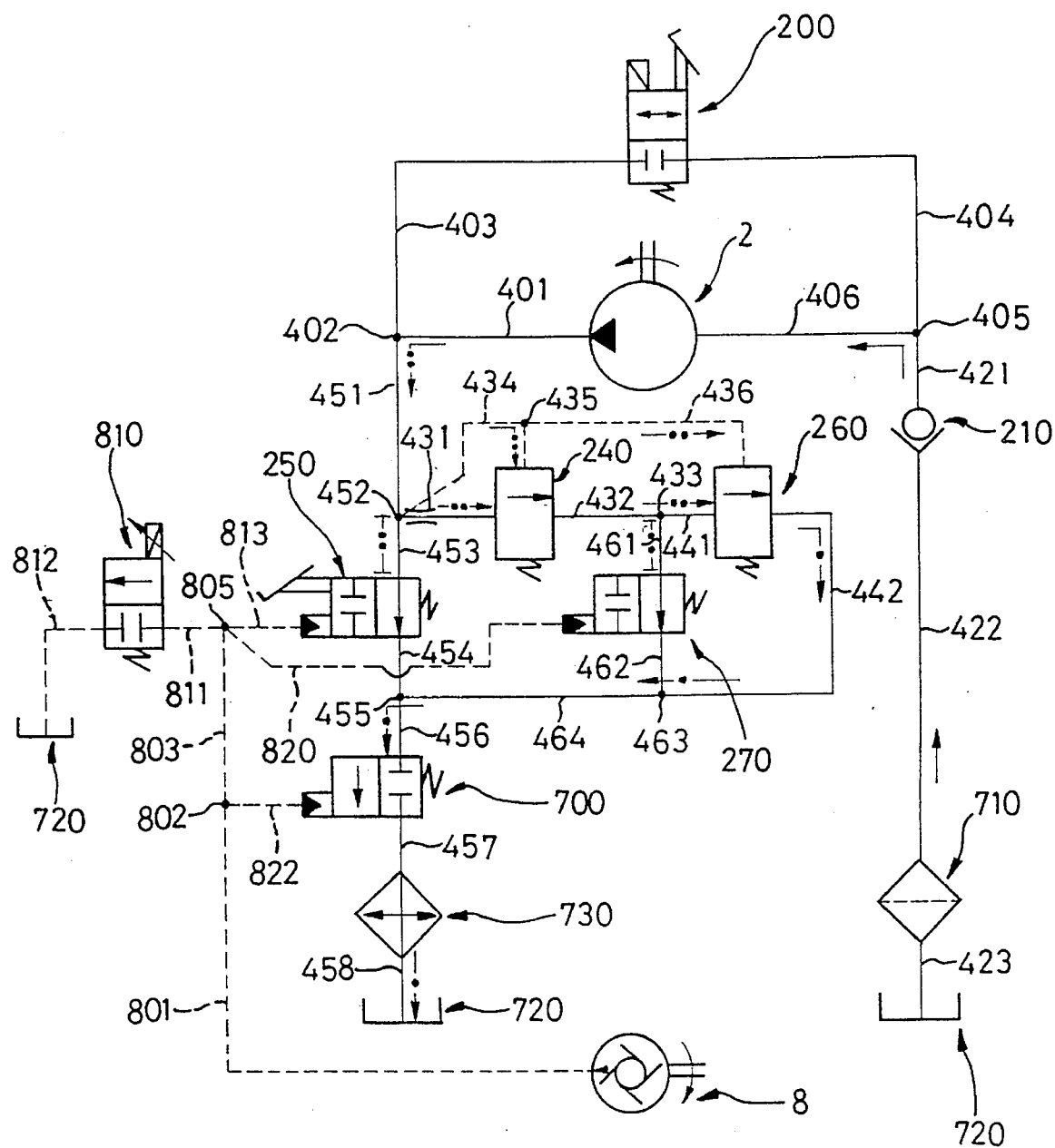
FIG. 6D is a schematic diagram of the oil system of FIG. 6, wherein the rotation speed of the engine is above 1500 r.p.m.

Referring to FIG. 6D, when the rotational speed of the engine is higher than 1500 r.p.m., the gear reduction ratio is in a range between 2:1 to 1.01:1 responsive to the load of the gear box.

Figure 6E:
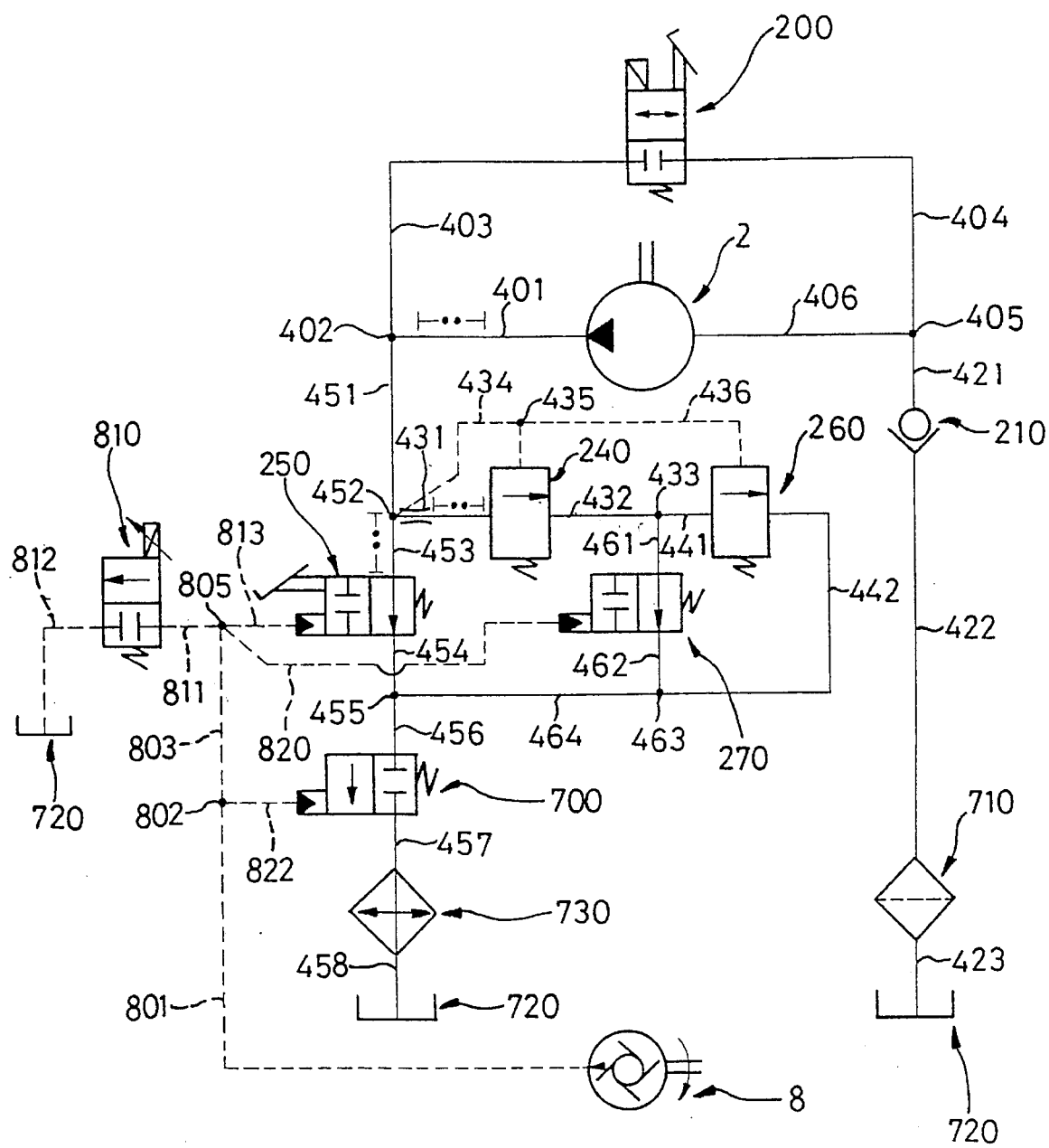
FIG. 6E is a schematic diagram of the oil system of FIG. 6, wherein the torque load ratio of the gear box is 1:1.

FIG. 6E illustrates the oil path system when the torque load ratio of the gear box is 1:1, while the braking pump 2 and the braking member are completely braked. The working fluid in oil paths 401, 451, 431, 434, and 436 does not flow.

Figure 6F:
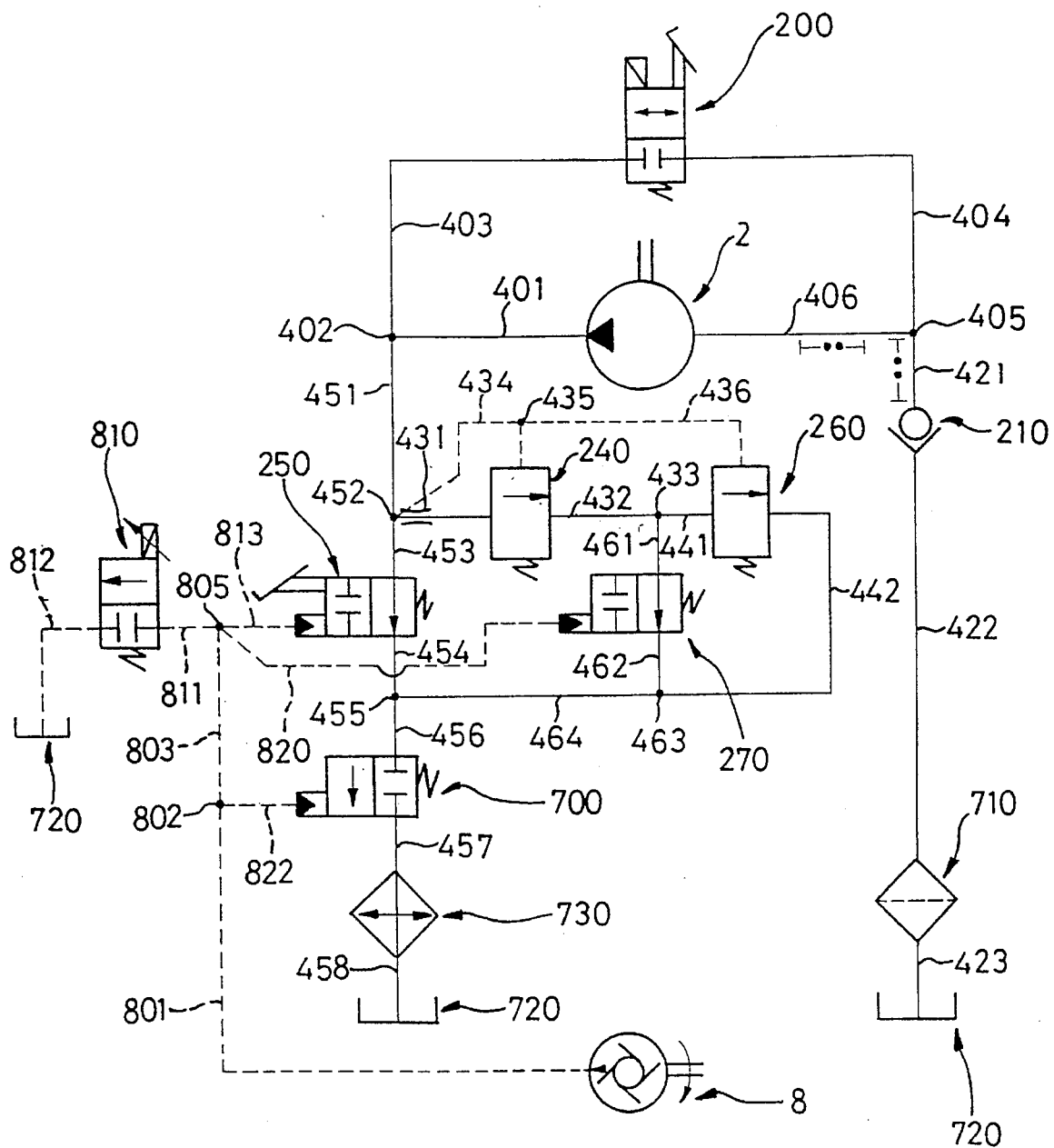
FIG. 6F is a schematic diagram of the oil system of FIG. 6 when under an engine braking condition.

FIG. 6F illustrates the oil path system when the vehicle is under engine braking condition in which the working fluid in oil paths 404, 406, and 421 does not flow. When the feeding direction of the inertial force is reversed, the braking direction is also reversed.

Although the invention has been explained in relation to its preferred embodiment, it is to be understood that many other possible modifications and variations can be made without departing from the spirit and scope of the invention as hereinafter claimed.

I claim:

1. An apparatus for torque-converter clutch transmission comprising:

an oil path system;

a braking pump (2) mounted in the oil path system and comprising an outer casing fixedly mounted to an inner wall of a gear box (1*d*) and a rotor shaft (2*a*);

a transitional braking pump (6) mounted in the oil path system and comprising an outer casing fixedly mounted to the inner wall of the gear box (1*d*) and a rotor shaft (61);

a disengagement valve (250) for idling mounted in the oil path system;

a one-way clutch (5) having a first end (51) fixedly mounted to the inner wall of the gear box (1*d*) and a second end (52) which is rotatable in one direction;

a final output planetary gear (10) comprising a sun gear (13) connected to an engine power output shaft (1) and functioning as a driving member, a planetary carrier (12) connected to an output shaft (1*c*) and functioning as a driven member, and a ring gear (11) functioning as a braking member;

a compound planetary gear train (9) comprising first and second planetary gears (91 and 92) each of which has a sun gear, a planet carrier and a ring gear which are respectively accommodated to function as either a driving member, a driven member, or a braking member therewithin, a driven gear in the second planetary gear relating to a corresponding driving gear in the first planetary gear, a driving gear in the second planetary gear relating to a corresponding driven gear in the first planetary gear, and a braking gear in the second planetary gear relating to a corresponding braking gear in the first planetary gear;

the sun gear (913) of the first planetary gear (91) being mounted on the engine power input shaft (1), the ring gear (911) of the first planetary gear (91) being connected to the hollow rotor shaft (2*a*) of the braking pump (2), and the planetary carrier (912) of the first planetary gear (91) being connected to the planetary carrier (922) of the second planetary gear (92);

the planetary carrier (922) of the second planetary gear (92) being connected to the second end (52) of the one way clutch (5), the sun gear (923) of the second planetary gear (92) being connected to the ring gear (11) of the final output planetary gear (10), the first and second planetary gears (91 and 92) of the compound planetary gear train (9) having a gear reduction ratio of 1:1;

a first transition planetary gear (20) comprising a sun gear (23), a planetary carrier (22) connected to the ring gear (921) of the second planetary gear (92), and a ring gear (21);

a second transition planetary gear (30) comprising a sun gear (33) connected to the sun gear (23) of the first transition planetary gear (20) and the rotor shaft (2*a*) of the braking pump (2), a planetary carrier (32) connected to the ring gear (21) of the first transition planetary gear (20), and a ring gear (31) mounted to the rotor shaft (61) of the transition braking pump (6); and a sensing means (8) mounted on the engine power output shaft (1) for sensing rotation speed of the engine power output shaft (1) and outputting predetermined amounts of pressurized working fluid responsive to the rotation speed of the engine power output shaft (1) to control the disengagement valve (250) for braking the braking pumps (2 and 6) which, in turn, brake the braking members of the planetary gears (10, 20, 30, 91, and 92), thereby obtaining a transmission.

2. The apparatus as claimed in claim 1, wherein the final output planetary gear (10) has a gear ratio of 1:3:2.

3. The apparatus as claimed in claim 2, wherein each of the braking pump (2) and the transitional braking pump (6) comprises first and second ports and the sensing means is a centrifugal pump (8) having an inlet and an outlet, and the oil path system comprises:

a first oil path (601) having a first end communicated to the first port of the transitional braking pump (6) and a second end, a first joint (602) being communicated to the second end of the first oil path (601);

a second oil path (611) having a first end communicated to the first joint (602) and a second end, a second joint (612) being communicated to the second end of the second oil path (611);

a third oil path (613) having a first end communicated to the second joint (603) and a second end, a third joint (616) communicated to the second end of the third oil path (613);

a throttling oil path (617) having a first end communicated to the third joint (616) and a second end;

a supercharger relief valve (610) having an inlet communicated to the second end of the throttling oil path (617) and an outlet and being completely opened when a torque load ratio of the gear box is above 1.5:1 and being completely closed when the torque load ratio is below 1:1;

a fourth oil path (618) having a first end communicated to the outlet of the supercharger relief valve (610) and a second end, a fourth joint (632) being communicated to the second end of the fourth oil path (618);

a fifth oil path (633) having a first end communicated to the fourth joint (632) and a second end;

a high pressure relief valve (630) having an inlet communicated to the second end of the fifth oil path (633) and an outlet and being completely opened when a torque load ratio of the gear box is above 3:1 and being completely closed when the torque load ratio is below 1.5:1;

a sixth oil path (634) having a first end communicated to the outlet of the high pressure relief valve (630) and a second end, a fifth joint (653) being communicated to the second end of the sixth oil path (634);

a seventh oil path (651) having a first end communicated to the third joint (616) and a second end;

a first check valve (650) having an inlet communicated to the second end of the seventh oil path (650) and an outlet;

an eighth oil path (652) having a first end communicated to the outlet of the first check valve (650) and a second end, a sixth joint (253) being communicated to the second end of the eighth oil path (652);

a ninth oil path (254) having a first end communicated to the sixth joint (253) and a second end;

the disengagement valve (250) for idling having an inlet communicated to the second end of the ninth oil path (254), an outlet, and a valve guiding chamber with a second inlet, the disengagement valve (250) being opened when the rotation speed of the engine is below a predetermined value;

a tenth oil path (255) having a first end communicated to the outlet of the disengagement valve (250) and a second end, a seventh joint (256) being communicated to the second end of the tenth oil path (255);

an eleventh oil path (257) having a first end communicated to the seventh joint (256) and a second end communicated to the fifth joint (653);

a twelfth oil path (656) having a first end communicated to the fifth joint (653) and a second end;

a shut-off valve (700) for parking having an inlet communicated to the second end of the twelfth oil path (656), an outlet, and a valve guiding chamber with a second inlet, the shut-off valve (700) being normally closed and being opened when the rotation speed of the engine is about 500 r.p.m.;

a thirteenth oil path (657) having a first end communicated to the outlet of the shut-off valve (700) and a second end, an eighth joint (674) being communicated to the second end of the thirteenth oil path (657);

a fourteenth oil path (631) having a first end communicated to the fourth joint (632) and a second end;

a second check valve (640) having an inlet communicated to the second end of the fourteenth oil path (631) and an outlet;

a fifteenth oil path (641) having a first end communicated to the outlet of the second check valve (640) and a second end, a ninth joint (208) being communicated to the second end of the fifteenth oil path (641);

a sixteenth oil path (603) having a first end communicated to the first joint (602) and a second end;

a rear manual valve (600) for neutral gear having a first port communicated to the second end of the sixteenth oil path (600) and a second port, the rear manual valve (600) being normally closed and being opened when a change in the gear is required;

a front manual valve (200) for neutral gear having first and second ports and being normally closed and being opened when a change in the gear is required;

a seventeenth oil path (604) having a first end communicated to the second port of the rear manual valve (600) and a second end, a tenth joint (606) being communicated to the second end of the seventeenth oil path (604);

an eighteenth oil path (605) having a first end communicated to the second port of the transitional braking pump (6) and a second end communicated to the tenth joint (606);

a nineteenth oil path (607) having a first end communicated to the tenth joint (606) and a second end;

a guiding check valve (620) having an outlet communicated to the second end of the nineteenth oil path (607), an inlet, and a valve guiding chamber with a second inlet;

a twentieth oil path (608) having a first end communicated to the inlet of the guiding check valve (620) and a second end, an eleventh joint (671) being communicated to the second end of the twentieth oil path (608);

a twenty-first oil path (672) having a first end communicated to the eleventh joint (671) and a second end;

a third check valve (670) having an inlet communicated to the second end of the twenty-first oil path (672) and an outlet;

a twenty-second oil path (673) having a first end communicated to the outlet of the third check valve (670) and a second end communicated to the eighth joint (674);

a twenty-third oil path (675) having a first end communicated to the eighth joint (674) and a second end;

a cooler (730) having an inlet communicated to the second end of the twenty-third oil path (675) and an outlet;

a twenty-fourth oil path (676) having a first end communicated to the outlet of the cooler (730) and a second end, an oil tank (720) communicated to the second end of the twenty-fourth oil path (676);

a first external guiding oil path (621) having a first end communicated to the first joint (602) and a second end communicated to the second inlet of the valve guiding chamber of the guiding check valve (620);

a twenty-fifth oil path (662) having first and second ends, a twelfth joint (212) being communicated to the first end of the twenty-fifth oil path (662);

a fourth check valve (660) having an inlet communicated to the second end of the twenty-fifth oil path (662) and an outlet;

a twenty-sixth oil path (661) having a first end communicated to the outlet of the fourth check valve (660) and a second end communicated to the eleventh joint (671);

a twenty-seventh oil path (201) having a first end communicated to the first port of the braking pump (2) and a second end, a thirteenth joint (202) being communicated to the second end of the twenty-seventh oil path (201);

a twenty-eighth oil path (221) having a first end communicated to the thirteenth joint (202) and a second end, a fourteenth joint (222) being communicated to the second end of the twenty-eighth oil path (221);

a twenty-ninth oil path (223) having a first end communicated to the fourteenth joint (222) and a second end;

a relief valve (220) having an inlet communicated to the second end of the relief valve (220) and an outlet;

a thirtieth oil path (224) having a first end communicated to the outlet of the relief valve (220) and a second end and being completely opened when a torque load ratio of the gear box is above 1.5:1 and being completely closed when the torque load ratio is below 1:1;

a fifth check valve (230) having an inlet communicated to the second end of the thirtieth oil path (224) and an outlet;

a thirty-first oil path (225) having a first end communicated to the outlet of the fifth check valve (230) and a second end communicated to the second joint (612);

a thirty-second oil path (241) having a first end communicated to the fourteenth joint (222) and a second end, a fifteenth joint (242) being communicated to the second end of the thirty-second oil path (241);

a thirty-third oil path (243) having a first end communicated to the fifteenth joint (242) and a second end;

a low pressure relief valve (240) having an inlet communicated to the second end of the thirty-third oil path (243), an outlet, and a valve guiding chamber with a second inlet, the low pressure relief valve (240) being completely opened when a torque load ratio of the gear box is above 1.3:1 and being completely closed when the torque load ratio is below 0.8:1;

a thirty-fourth oil path (244) having a first end communicated to the outlet of the low pressure relief valve (240) and a second end, a sixteenth joint (245) being communicated to the second end of the thirty-fourth oil path (244);

a thirty-fifth oil path (261) having a first end communicated to the sixteenth joint (245) and a second end;

a delay-action switch valve (270) having an inlet communicated of the second end of the forty-eighth oil path (271), an outlet, and a valve guiding chamber with a second inlet, the delay-action switch valve (270) being normally opened and being closed when the rotation speed of the engine is higher than 1500 r.p.m.;

a mediate pressure relief valve (260) having an inlet communicated to the second end of the thirty-fifth oil path (261), an outlet, and a valve guiding chamber with a second inlet, the mediate pressure relief valve (260) being completely opened when a torque load ratio of the gear box is above 1.6:1 and being completely closed when the torque load ratio is below 1.5:1 while the delay-action switch valve (270) is closed;

a thirty-sixth oil path (262) having a first end communicated to the outlet of the mediate pressure relief valve (260) and a second end, a seventeenth joint (263) being communicated to the second end of the thirty-sixth oil path (262);

a thirty-seventh oil path (264) having a first end communicated to the seventeenth joint (263) and a second end communicated to the seventh joint (256);

a thirty-eighth oil path (251) having a first end communicated to the fifteenth joint (242) and a second end;

a sixth check valve (280) having an inlet communicated to the second end of the thirty-eight oil path (251) and an outlet;

a thirty-ninth oil path (252) having a first end communicated to the outlet of the sixth check valve (280) and a second end communicated to the sixth joint (253);

a second external guiding oil path (247) having a first end communicated to the third joint (616) and a second end communicated to a joint (246) for external guiding oil paths;

a third external guiding oil path (248) having a first end communicated to the joint (246) and a second end communicated to the second inlet of the valve guiding chamber of the low pressure relief valve (240);

a fourth external guiding oil path (265) having a first end communicated to the joint (246) and a second end communicated to the second inlet of the valve guiding chamber of the mediate pressure relief valve (260);

a fortieth oil path (203) having a first end communicated to the thirteenth joint (202) and a second end communicated to the first port of the front manual valve (200);

a forty-first oil path (204) having a first end communicated to the second port of the front manual valve (200) and a second end, an eighteenth joint (206) being communicated to the second end of the forty-first oil path (204);

a forty-second oil path (205) having a first end communicated to the second port of the braking pump (2) and a second end communicated to the eighteenth joint (206);

a forty-third oil path (207) having a first end communicated to the eighteenth joint (206) and a second end communicated to the ninth joint (208);

a forty-fourth oil path (209) having a first end communicated to the ninth joint (208) and a second end;

a seventh check valve (210) having an outlet communicated to the second end of the forty-fourth oil path (209) and an inlet;

a forty-fifth oil path (211) having a first end communicated to the inlet of the seventh check valve (210) and a second end communicated to the twelfth joint (212);

a forty-sixth oil path (213) having a first end communicated to the twelfth joint (212) and a second end;

an oil filter (710) having an outlet communicated to the second end of the forty-sixth oil path (213) and an inlet;

a forty-seventh oil path (214) having a first end communicated to the inlet of the oil filter (710) and a second end communicated to the oil tank (720);

a forty-eighth oil path (271) having a first end communicated to the sixteenth joint (245) and a second end;

a forty-ninth oil path (272) having a first end communicated to the outlet of the delay-action switch valve (270) and a second end communicated to the eighteenth joint (263);

a fiftieth oil path (801) having a first end communicated to the outlet of the centrifugal pump (8) and a second end, a nineteenth joint (802) being communicated to the second end of the fiftieth oil path (801);

a fifty-first oil path (822) having a first end communicated to the nineteenth joint (802) and a second end communicated to the second inlet of the valve guiding chamber of the shut-off valve (700);

a fifty-second oil path (803) having a first end communicated to the nineteenth joint (802) and a second end, a twentieth joint (821) being communicated to the second end of the fifty-second oil path (803);

a fifty-third oil path (820) having a first end communicated to the twentieth joint (821) and a second end communicated to the inlet of the valve guiding chamber of the delay-action switch valve (270);

a fifty-fourth oil path (804) having a first end communicated to the twentieth joint (821) and a second end, a twenty-first joint (805) being communicated to the second end of the fifty-fourth oil path (804);

a fifty-fifth oil path (813) having a first end communicated to the twenty-first joint (805) and a second end communicated to the inlet of the valve guiding chamber of the disengagement valve (250);

a fifty-sixth oil path (811) having a first end communicated to the twenty-first joint (805) and a second end;

a high idling speed control valve (810) having an inlet communicated to the second end of the fifty-sixth oil path (811) and an outlet and being opened for increasing the idling speed of the engine when needed; and a fifty-seventh oil path (812) having a first end communicated to the outlet of the high idling speed control valve (810) and a second end communicated to the oil tank (720).

* * * * *